United States Patent
Park et al.

(10) Patent No.: US 10,034,047 B2
(45) Date of Patent: Jul. 24, 2018

(54) METHOD AND APPARATUS FOR OUTPUTTING SUPPLEMENTARY CONTENT FROM WFD

(71) Applicant: LG ELECTRONICS INC., Seoul (KR)

(72) Inventors: Giwon Park, Seoul (KR); Byungjoo Lee, Seoul (KR); Dongcheol Kim, Seoul (KR); Hyunhee Park, Seoul (KR); Taesung Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/534,914

(22) PCT Filed: Dec. 9, 2015

(86) PCT No.: PCT/KR2015/013464
§ 371 (c)(1),
(2) Date: Jun. 9, 2017

(87) PCT Pub. No.: WO2016/093623
PCT Pub. Date: Jun. 16, 2016

(65) Prior Publication Data
US 2017/0374412 A1  Dec. 28, 2017

Related U.S. Application Data

(60) Provisional application No. 62/167,269, filed on May 28, 2015, provisional application No. 62/166,696, (Continued)

(51) Int. Cl.
*H04N 7/15* (2006.01)
*H04N 21/4402* (2011.01)
(Continued)

(52) U.S. Cl.
CPC ........ *H04N 21/4402* (2013.01); *H04W 8/005* (2013.01); *H04W 84/12* (2013.01); *H04N 21/6437* (2013.01)

(58) Field of Classification Search
None
See application file for complete search history.

(56) References Cited

U.S. PATENT DOCUMENTS 6,894,706 B1   5/2005   Ward et al.
8,677,029 B2 * 3/2014   Raveendran ........ H04W 28/18
                                                          710/10
(Continued)

FOREIGN PATENT DOCUMENTS

KR   1020140044235 A   4/2014
KR   1020140110047 A   9/2014
(Continued)

OTHER PUBLICATIONS

WiFi Alliance, "Wi-Fi Alliance Technical Committee, Wi-Fi Display Technical Task Force, Wi-Fi Display Technical Specification Version 1.0.0," 2012.
(Continued)

*Primary Examiner* — Creighton Smith
(74) *Attorney, Agent, or Firm* — Dentons US LLP

(57) ABSTRACT

A method and apparatus for outputting a supplementary content from a WFD is disclosed. The method for outputting a supplementary content from a WFD may comprise the steps of: after a WFD source is connected to a WFD, transmitting, by the WFD source, an RTSP parameter request message on the basis of an RTSP to a WFD sink in order to perform a capability negotiation procedure with the WFD sink; transmitting, by the WFD source, an RTSP parameter response message to the WFD sink in response to the RTSP parameter request message; and after performing the capability negotiation procedure, transmitting, by the
(Continued)

WFD source, a transmission stream, obtained by overlapping and multiplexing a video stream including video data having a first resolution and a supplementary stream including supplementary data having a second resolution, to the WFD sink, wherein a WFD discovery response frame includes second resolution-related information for determining the second resolution, and an RTSP parameter response frame includes the second resolution-related information.

10 Claims, 19 Drawing Sheets

Related U.S. Application Data filed on May 27, 2015, provisional application No. 62/167,251, filed on May 27, 2015, provisional application No. 62/166,663, filed on May 26, 2015, provisional application No. 62/090,379, filed on Dec. 11, 2014.

(51) Int. Cl.
*H04W 8/00* (2009.01)
*H04W 84/12* (2009.01)
*H04N 21/6437* (2011.01)

(56) References Cited

U.S. PATENT DOCUMENTS

| | | | | |
|---|---|---|---|---|
| 8,914,187 | B2* | 12/2014 | Wang | H04L 65/4092 370/474 |
| 8,964,783 | B2* | 2/2015 | Huang | H04L 65/608 370/230 |
| 9,430,177 | B2* | 8/2016 | Thangadorai | G06F 3/1423 |
| 2013/0238702 | A1* | 9/2013 | Sheth | H04L 67/38 709/204 |
| 2013/0242117 | A1 | 9/2013 | Luo et al. | |
| 2013/0346562 | A1* | 12/2013 | Kim | H04L 65/608 709/219 |
| 2014/0096165 | A1 | 4/2014 | Bei et al. | |
| 2014/0247197 | A1 | 9/2014 | Margulis | |
| 2014/0319485 | A1* | 10/2014 | Lee | H01L 51/0067 257/40 |
| 2015/0249714 | A1* | 9/2015 | Vedula | H04L 67/141 709/228 |
| 2016/0139868 | A1* | 5/2016 | Vedula | G06F 3/0481 715/738 |
| 2017/0013027 | A1* | 1/2017 | Lee | H04L 65/1066 |
| 2017/0171892 | A1* | 6/2017 | Lee | H04W 76/02 |
| 2017/0374412 | A1* | 12/2017 | Park | H04N 21/4402 |

FOREIGN PATENT DOCUMENTS

KR 1020140111010 A 9/2014
WO 2014182411 A1 11/2014

OTHER PUBLICATIONS

Hirata; IEICE Technial Report, IN2008-1-8, ISSN 0913-5685, vol. 108 No. 60, May 29, 2008.

* cited by examiner

METHOD AND APPARATUS FOR OUTPUTTING SUPPLEMENTARY CONTENT FROM WFD

CROSS-REFERENCE TO RELATED APPLICATIONS

This application is a National Stage filing under 35 U.S.C. 371 of International Application No. PCT/KR2015/013464, filed on Dec. 9, 2015, which claims the benefit of U.S. Provisional Applications No. 62/090,379 filed on Dec. 11, 2014, No. 62/166,663 filed on May 26, 2015, No. 62/167,251 filed on May 27, 2015, No. 62/166,696 filed on May 27, 2015 and No. 62/167,269 filed on May 28, 2015, the contents of which are all hereby incorporated by reference herein in their entirety.

BACKGROUND OF THE INVENTION

Field of the Invention

The present invention relates to wireless communication and, most particularly, to a method and apparatus for outputting supplementary content from a wireless fidelity (Wi-Fi) display (WFD).

Related Art

Although the performance of mobile devices has evolved remarkably to be considered as the equivalent of personal computers (PCs), the mobile device still has its limitations in screen size. Most particularly, since portability is one of the most important features of the mobile device, it marginal line for screen size is said to be equal to 6 inches. However, for users who enjoy viewing multi-media content, a 6-inch display may still be considered to be a small screen.

Accordingly, extensive research is being carried out for developing a technology enabling users to watch images (or video) that were viewed in the mobile device through large-sized television (TV) screens or monitor screens. This technology may also be expressed by using the term wireless display transmission technology. The wireless display transmission technology may be broadly divided into content transmission and mirroring (screen casting). Instead of directly transmitting the display screen of the mobile device as it is, content transmission should be associated with Video on Demand (VOD) services. More specifically, content transmission is a method of sending images (or video) via signal, and mirroring is a method of sending a content filed to a remote device via streaming in order to show (or display) the same content once again through a large-sized screen, such as a TV screen.

Just as implied in the term itself, mirroring (screen casting) corresponds to a method of simultaneously showing a screen that is displayed on a mobile device as though it is reflected on a mirror. This is similar to a method of projecting a computer screen through a projector, when performing a presentation by establishing a wired connection, such as D-Subminiature (D-sub) (RGB), Digital Visual Interface (DVI), High-Definition Multimedia Interface (HDMI). The mirroring method is advantageous in that it can wirelessly transmit pixel information of an original screen without modification in real-time without being dependent on a specific service.

WiFi Miracast is being researched as a wireless display transmission technology using Wi-Fi. Miracast is a wireless image (or video) transmission standard as well as a wireless display transmission technology. Miracast is a type of mirroring (screen casting) technology, wherein the display screen and sound are compressed and outputted to a wireless LAN and then the compressed display screen and sound are decompressed in a dongle or an all-in-one receiver, thereby being displayed on the screen.

SUMMARY OF THE INVENTION

Technical Objects

An object of the present invention is to provide a method for outputting supplementary content from a WFD.

Another object of the present invention is to provide an apparatus for outputting supplementary content from a WFD.

Technical Solutions

In order to achieve the above-described technical object of the present invention, according to an aspect of the present invention, a method for outputting auxiliary data in a Wi-Fi Display (WFD) may include the steps of transmitting, by a WFD source, a WFD service discovery request frame for discovering service capability to a WFD sink, receiving, by the WFD source, a WFD service discovery response frame from the WFD sink as a response to the WFD service discovery request frame, setting up, by the WFD source, a WFD connection with the WFD sink based on the WFD service discovery response frame, after setting up the WFD connection, transmitting, by the WFD source, a RTSP parameter request message being configured based on a real time streaming protocol (RTSP) for a capability negotiation procedure with the WFD sink to the WFD sink, transmitting, by the WFD source, a RTSP parameter response message to the WFD sink as a response to the RTSP parameter request message, and, after performing the capability negotiation procedure, transmitting, by the WFD source, a transport stream to the WFD sink, wherein the transport stream is configured by overlay multiplexing a video stream including video data of a first resolution and an auxiliary stream including auxiliary data of a second resolution, wherein the WFD service discovery response frame may include information related to a second resolution for determining the second resolution, and wherein the RTSP parameter response message may include information related to the second resolution.

Meanwhile, the auxiliary data may include subtitle data and user interface data, and the information related to the second resolution may include information on a native resolution of the WFD sink, wherein the first resolution may be determined based on a native resolution of the WFD source, and wherein the second resolution may be determined based on the native resolution of the WFD sink.

Also, the auxiliary data may include subtitle data and user interface data, and the information related to the second resolution may include information on a maximum resolution being supported for the auxiliary data of the WFD sink, wherein the first resolution may be determined based on a native resolution of the WFD source, and wherein the second resolution may be determined based on the information on a maximum resolution being supported for the auxiliary data of the WFD sink.

Also, the video data may be rescaled by the WFD sink and outputted in a resolution that is different from the first resolution, and the auxiliary data may be outputted by the WFD sink in the second resolution without being processed with rescaling.

Also, the method may further include the steps of receiving, by the WFD source, user operation information according to user operations performed in the WFD sink through a user input back channel (UIBC) from the WFD sink, and performing, by the WFD source, operations corresponding to the user operation information, wherein the user operation information may include stream information, and wherein the stream information may include identification information indicating on which image, among a plurality of overlaying images, the user operation is being performed, wherein the plurality of overlaying images may be based on each of the video data and the auxiliary data being outputted from the WFD sink.

In order to achieve the above-described technical object of the present invention, according to another aspect of the present invention, a Wi-Fi Display (WFD) source for transmitting auxiliary data in a WFD may include a radio frequency (RF) unit transmitting or receiving radio signals, and a processor being operatively connected to the RF unit, wherein the processor may be configured to transmit a WFD service discovery request frame for discovering service capability to a WFD sink, to receive a WFD service discovery response frame from the WFD sink as a response to the WFD service discovery request frame, to set up a WFD connection with the WFD sink based on the WFD service discovery response frame, after setting up the WFD connection, to transmit a RTSP parameter request message being configured based on a real time streaming protocol (RTSP) for a capability negotiation procedure with the WFD sink to the WFD sink, to transmit a RTSP parameter response message to the WFD sink as a response to the RTSP parameter request message, and, after performing the capability negotiation procedure, to transmit a transport stream to the WFD sink, wherein the transport stream is configured by overlay multiplexing a video stream including video data of a first resolution and an auxiliary stream including auxiliary data of a second resolution, wherein the WFD service discovery response frame may include information related to a second resolution for determining the second resolution, and wherein the RTSP parameter response message may include information related to the second resolution.

Meanwhile, the auxiliary data may include subtitle data and user interface data, and the information related to the second resolution may include information on a native resolution of the WFD sink, wherein the first resolution may be determined based on a native resolution of the WFD source, and wherein the second resolution may be determined based on the native resolution of the WFD sink.

Also, the auxiliary data may include subtitle data and user interface data, and the information related to the second resolution may include information on a maximum resolution being supported for the auxiliary data of the WFD sink, wherein the first resolution may be determined based on a native resolution of the WFD source, and wherein the second resolution may be determined based on the information on a maximum resolution being supported for the auxiliary data of the WFD sink.

Also, the video data may be rescaled by the WFD sink and outputted in a resolution that is different from the first resolution, and the auxiliary data may be outputted by the WFD sink in the second resolution without being processed with rescaling.

Furthermore, the processor may be further configured to receive user operation information according to user operations performed in the WFD sink through a user input back channel (UIBC) from the WFD sink, and to perform operations corresponding to the user operation information, wherein the user operation information may include stream information, and wherein the stream information may include identification information indicating on which image, among a plurality of overlaying images, the user operation is being performed, wherein the plurality of overlaying images may be based on each of the video data and the auxiliary data being outputted from the WFD sink.

Effects of the Invention

When transmitting auxiliary contents from a WiFi display (WFD) source to a WFD sink, an auxiliary stream, which includes auxiliary contents having a resolution that can be supported by the WFD sink, may be transmitted. Therefore, in accordance with the resolution of the WIFD sink, the auxiliary contents may be adaptively outputted to the display of the WFD sink.

DESCRIPTION OF EXEMPLARY EMBODIMENTS

In the conventional wireless LAN system, operations between devices (access point (AP) and station (STA)) within an infrastructure basic service set (BSS), wherein the access point (AP) functions as a hub, were mostly defined. The AP may perform a function of supporting a physical layer for a wireless/wired connection, a routing function for devices within the network, a function of adding/removing devices to/from the network, a function of providing services, and so on. More specifically, in the conventional wireless LAN system, devices within the network are connected through the AP and not connected to one another by direct connection.

As a technology for supporting direct connection between devices, a Wi-Fi Direct standard is being defined. Wi-Fi Direct is a direct communication technology allowing devices (or stations (STAs)) to be easily connected to one another without an access point, which is essentially required in the conventional wireless LAN system. In case Wi-Fi Direct is being used, connection between the devices is configured without any complicated configuration (or set-up) procedures. Thus, diverse services may be provided to the user.

In the Wi-Fi Alliance (WFA), a Wi-Fi Direct service (WFDS), which supports diverse services using a Wi-Fi Direct link (e.g., Send, Play, Display, Print, and so on), is being researched. According to the WFDS, an application may be controlled or managed by a service platform, which is referred to as an Application Service Platform (ASP).

A WFDS device supporting a WFDS includes devices supporting a wireless LAN system, such as display devices, printers, digital cameras, projectors, smart phones, and so on. Also, the WFDS device may include an STA and an AP. WFDS devices within a WFDS network may be directly connected to one another.

Figure 1:
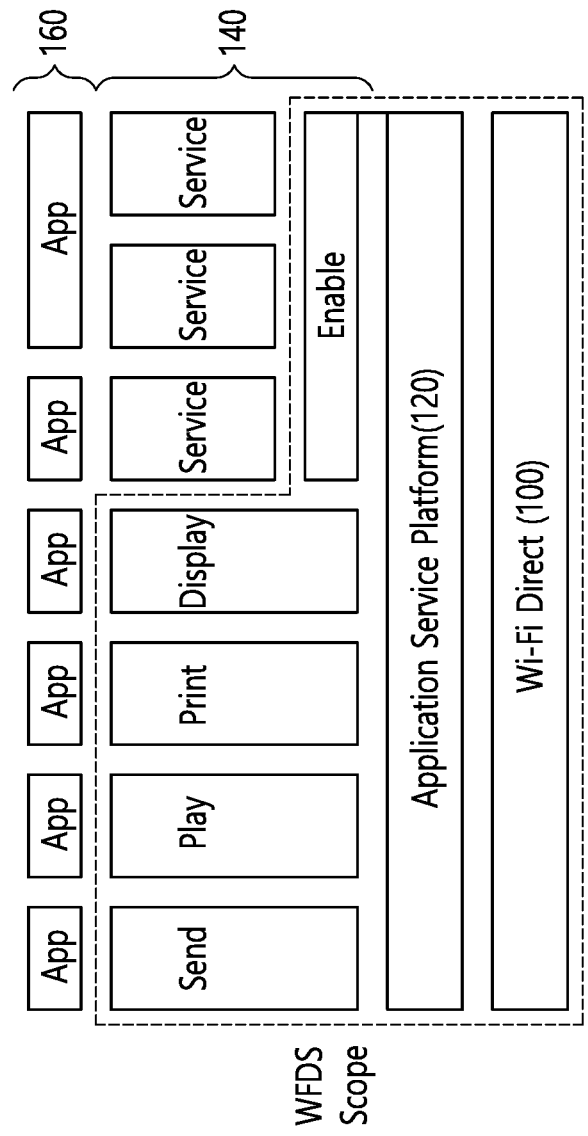
FIG. 1 is a conceptual view illustrating Wi-Fi Direct Service (WFDS) configuration elements (or components).

FIG. 1 is a conceptual view illustrating Wi-Fi Direct Service (WFDS) configuration elements (or components).

Referring to FIG. 1, a WFDS framework may include a Wi-Fi Direct layer 100, an ASP 120, a service layer 140, and an application layer 160.

The Wi-Fi Direct layer 100 corresponds to a medium access control (MAC) layer, which is defined in the Wi-Fi Direct standard. A wireless connection may be configured by a physical layer (not shown), which is backward compatible with a Wi-Fi PHY, below the Wi-Fi Direct layer 100. An Application Service Platform (ASP) 120 is defined above the Wi-Fi Direct layer 100.

The ASP 120 corresponds to a common shared platform, and the ASP 120 performs the functions of session management, service command processing, and control and security between ASPs between the Application layer 160, which is a higher layer of the ASP 120, and the Wi-Fi Direct layer 100, which is a lower layer of the ASP 120.

The Service layer 140 is defined above the ASP 120. For example, the Service layer 140 may support 4 basic service, which correspond to Send, Play, Display, and Print services, and a service that is defined in a third-party application. Moreover, the Service layer 140 may also support Wi-Fi Serial Bus (WSB), Wi-Fi Docking, or Neighbor Awareness Networking (NAN).

The application layer 160 may provide a user interface (UI), and the application layer 160 may also express information in a format that can be recognized by human beings and may deliver (or transport) user input to a lower layer.

Hereinafter, the exemplary embodiment of the present invention will disclose a wireless fidelity (Wi-Fi) display (WFD) among the WFDS in more detail.

The WFD standard was defined for performing transmission of audio/video (AV) data between devices while satisfying high quality and low latency. Wi-Fi devices may be connected to one another by using a peer-to-peer method through a WFD network (WFD session) to which the WFD standard is applied without passing through a home network, an office network, or a hotspot network. Hereinafter, a device that transmits and receives data in accordance with the WFD standard may be expressed by using the term WFD device. The WFD devices within the WRD network may discover information on the WFD devices (e.g., capability information) corresponding to one another. And, then, after configuring (or setting up) the WFD session, the WFD devices may perform rendering on the contents through the WFD session.

A WFD session may correspond to a network between a source device, which provides contents, and a sink device, which receives and performs rendering of the contents. The source device may also be expressed by using the term WFD source, and the sink device may also be expressed by using the term WFD sink. The WFD source may perform mirroring of the data existing in the display (or screen) of the WFD source to the display of the WFD sink.

The WFD source and the WFD sink may exchange a first sequence message between one another and may then perform device discovery and service discovery procedures. After completing the device discovery and service discovery procedures between the WFD source and the WFD sink, an internet protocol (IP) address may be allocated to each of the WFD source and the WFD sink. A transmission control protocol (TCP) connection may be established between the WFD source and the WFD sink, and, afterwards, real-time streaming protocol (RTSP) and real-time protocol (RTP) stacks corresponding to the WFD source and the WFD sink may be activated.

A capability negotiation procedure between the WFD source and the WFD sink may be performed through the RTSP, and, while the capability negotiation procedure is being carried out, the WFD source and the WFD sink may exchange RTSP-based messages (message (M) 1 to M4). Thereafter, the WFD source and the WFD sink may exchange WFD session control messages. Also, a data session may be established between the WFD source and the WFD sink through the RTP. In the WFD network, a User Datagram Protocol (UDP) may be used for data transport.

Figure 2:
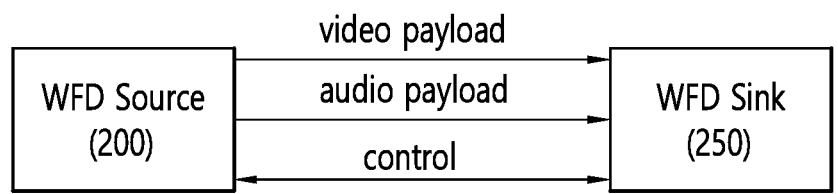
FIG. 2 is a conceptual view illustrating a WFD network.

FIG. 2 is a conceptual view illustrating a WFD network.

Referring to FIG. 2, as WFD devices, a WFD source 200 and a WFD sink 250 may be connected to one another based on WiFi-P2P.

Herein, the WFD source 200 may refer to a device supporting streaming of multimedia contents through a WiFi peer to peer (P2P) link, and the WFD sink 250 may refer to a device performing procedures of receiving multimedia contents from the WFD source 200 through the P2P link and generating image and/or sound. The procedure of generating image and/or sound may also be expressed by using the term rendering.

The WFD sink 250 may be divided into a primary sink and a secondary sink. Most particularly, when independently connected to the WFD source 200, the secondary sink may perform rendering only on an audio payload.

Figure 3:
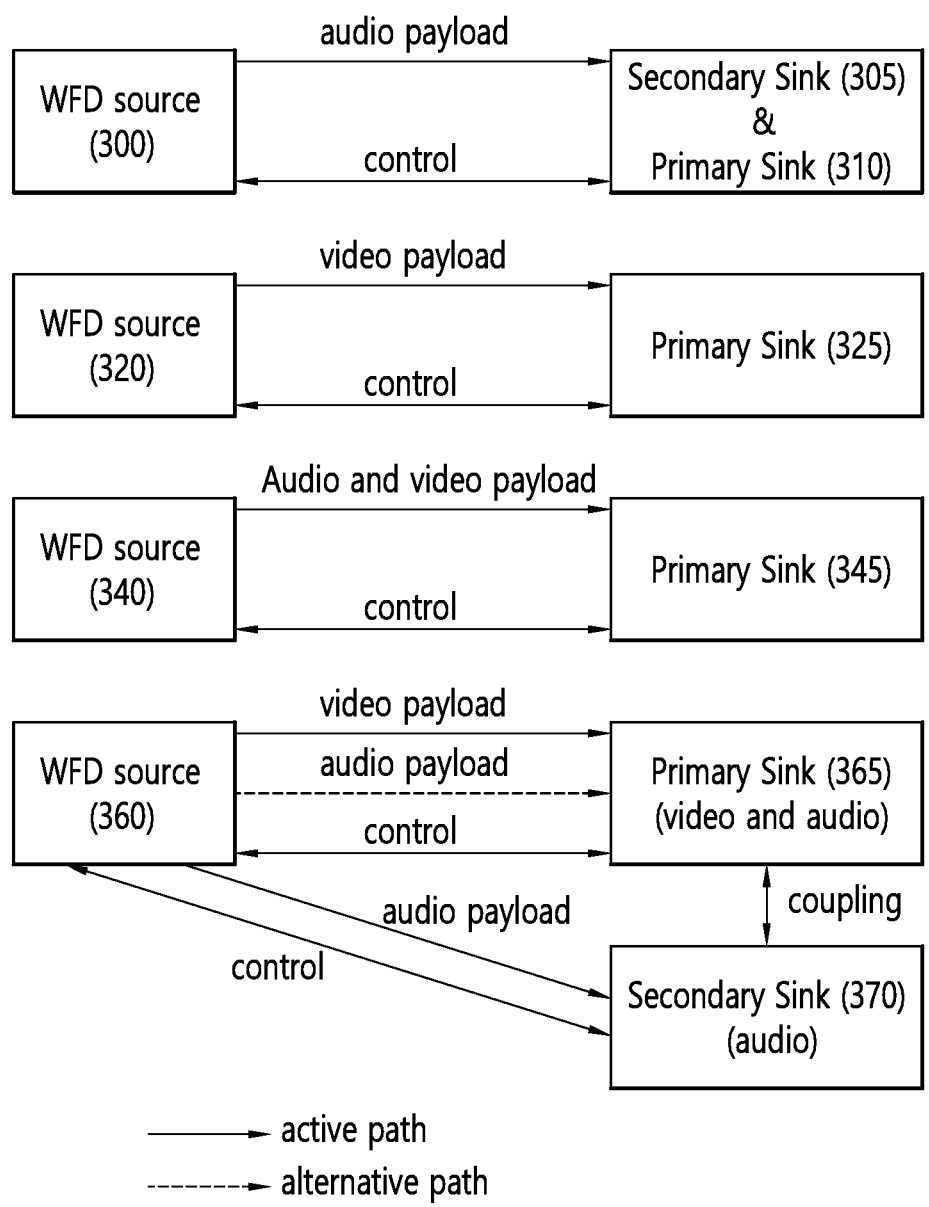
FIG. 3 is a conceptual view illustrating a WFD session.

FIG. 3 is a conceptual view illustrating a WFD session.

The first part starting from the top of FIG. 3 corresponds to an audio-only session. A WFD source 300 may be connected to any one of a primary sink 305 and a secondary sink 310 through the audio-only session.

The second part starting from the top of FIG. 3 corresponds to a video-only session. A WFD source 320 may be connected to a primary sink 325.

The third part starting from the top of FIG. 3 corresponds to an audio and video session, and, just as in the video-only session, a WFD source 340 may be connected to a primary sink 345.

The fourth part starting from the top of FIG. 3 discloses a session connection in a Coupled WFD Sink operation. In the Coupled Sink WFD operation, the primary sink 365 may perform video rendering, and the secondary sink 370 may perform audio rendering. Alternatively, the primary sink 365 may perform both video rendering and audio rendering.

The above-described WFD sessions may be established after performing the procedures described below in FIG. 4.

Figure 4:
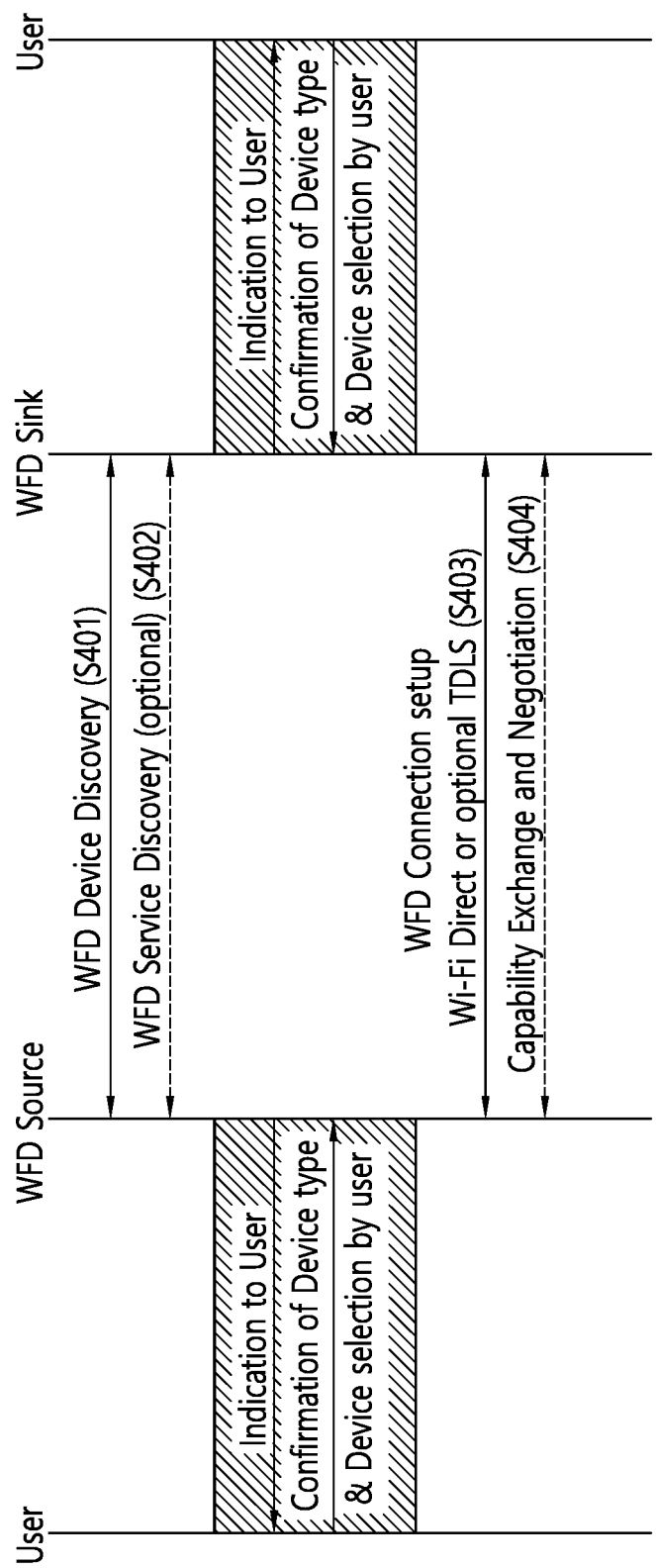
FIG. 4 is a conceptual view illustrating a WFD session configuration method.

FIG. 4 is a conceptual view illustrating a WFD session configuration method.

Referring to FIG. 4, the WFD session may be set up (or configured) after performing WFD Device Discovery S401, WFD Service Discovery S402, WFD Connection Setup S403, and Capability Exchange and Negotiation S404 procedures.

More specifically, in the procedure of WFD Device Discovery S401, the WFD source may discover a peer device for WFD, i.e., WFD sink by performing the WFD Device Discovery procedure.

A beacon frame, a probe request frame, and a probe response frame, which are transmitted by the WFD source and the WFD sink for the WFD Device Discovery, may include WFD Information Element (IE). Herein, WFD IE may correspond to an information element including information related to the WFD, such as device type, device status, and so on.

The WFD source may transmit a probe request frame including a WFD IE to the WFD sink, and the WFD sink may transmit a probe response frame including a WFD IE as a response to the probe request frame. In case the WFD device is associated with an infrastructure AP and operates as a Wi-Fi P2P device, a WFD IE and a P2P information element may be included in the probe request frame. The probe response frame, which is transmitted as a response to the probe request frame, may be transmitted through the channel through which the probe request frame was received and may include both the P2P IE and the WFD IE.

Details related to the WFD Device Discovery procedure that are not mentioned in this description may follow related documents, such as 'Wi-Fi Display Technical Specification' and/or 'Wi-Fi Peer-to-Peer (P2P) Technical Specification Wi-Fi Direct Service Addendum', and this may also be applied to the descriptions that follow.

In the procedure of WFD Service Discovery S402, a discovery procedure corresponding to service capability between the WFD source and the WFD sink, which have performed WFD Device Discovery, may be performed. For example, if the WFD source transmits a service discovery request frame, which includes information on WFD capability, the WFD sink may transmit a service discovery response frame, which includes information on the WFD capability, as a response to the service discovery request frame. The WFD service discovery procedure may correspond to an optional procedure.

In order to perform the WFD service discovery procedure, the probe request frame and the probe response frame, which are used in the WFD device discovery procedure, may include information indicating whether or not the WFD device is equipped with the capability supporting the service discovery procedure.

In the procedure of WFD Connection Setup S403, the WFD device, which has performed the WFD device discovery procedure, and which has optionally performed the WFD service discovery procedure, may select a WFD device for performing WFD connection setup. After the WFD device is selected for the WFD connection setup in accordance with the policy or user input, and so on, any one of the connectivity schemes between Wi-Fi P2P and tunneled direct link service (TDLS) may be used for WFD connection. The WFD devices may determine a connection method based on an associated basic service set identifier (BSSID) subelement, which is transported along with preferred connectivity information and WFD information elements.

Figure 5:
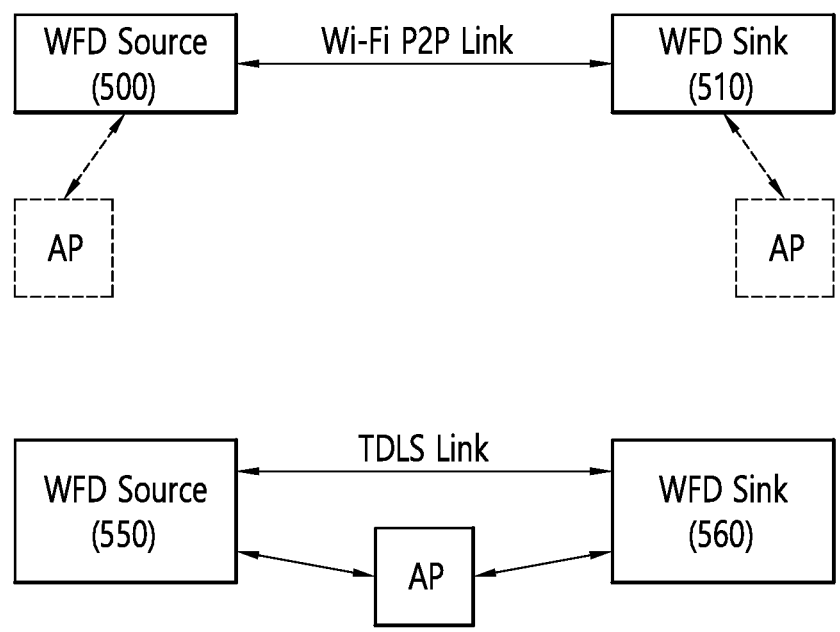
FIG. 5 is a conceptual view illustrating a network between a WFD source and a WFD sink.

FIG. 5 is a conceptual view illustrating a network between a WFD source and a WFD sink.

An upper part of FIG. 5 discloses a connection between a WFD source 500 and a WFD sink 510 that is based on Wi-Fi P2P, and a lower part of FIG. 5 discloses a connection between a WFD source 550 and a WFD sink 560 that is based on a TDLS link.

As shown in the upper part of FIG. 5, the AP may be common to both the WFD source 500 and the WFD sink 510, or the AP may be different for each of the WFD source 500 and the WFD sink 510. Alternatively, the AP may not exist. As shown in the lower part of FIG. 5, in case WFD connection is performed by using a TDLS link, the WFD source 550 and the WFD sink 560 shall maintain connection with the same AP.

The WFD capability exchange and negotiation procedure may be performed after performing the WFD connection setup procedure between the WFD devices. By performing the WFD capability exchange and negotiation procedure, the WFD source and the WFD sink may exchange at least one set of information on the codec supported by each of the WFD source and the WFD sink, profile information of the codec, level information of the codec, and resolution information. The WFD capability exchange and negotiation procedure may be performed by exchanging messages using a Real Time Streaming Protocol (RTSP). Also, a parameter set defining audio/video payload during a WFD session may be determined. The WFD capability exchange and negotiation procedure may be performed by exchanging messages starting from RTSP M1 to RTSP M4, as shown in FIG. 6.

The WFD session establishment procedure may be performed after the WFD exchange and negotiation procedure.

Figure 6:
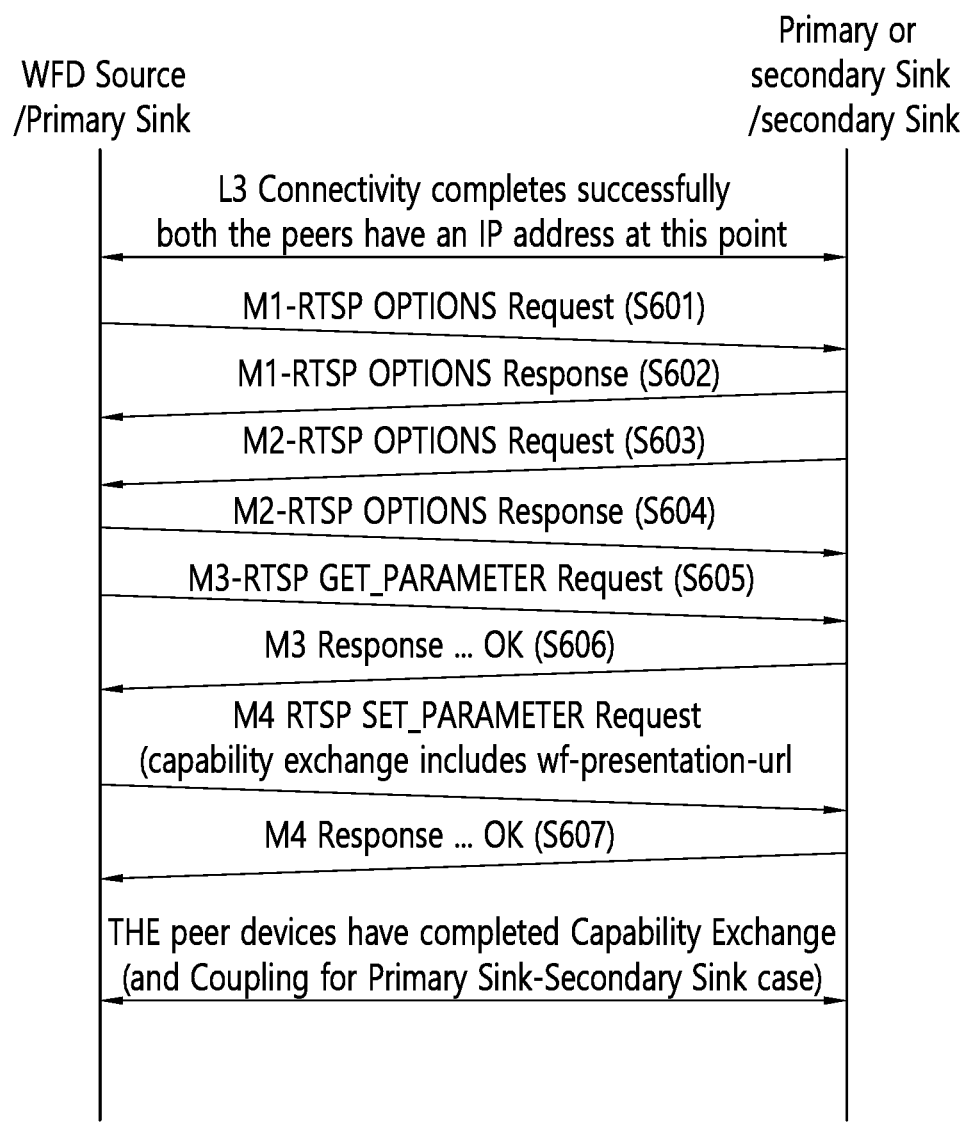
FIG. 6 is a conceptual view illustrating WFD capability exchange and negotiation procedures.

FIG. 6 is a conceptual view illustrating WFD capability exchange and negotiation procedures.

Referring to FIG. 6, the WFD source may transmit a RTSP M1 request message for initiating a RSTP procedure and WFD capability negotiation (step S601).

The RTSP M1 request message may include a RTSP OPTIONS request for determining a RTSP method set, which is supported by the WFD sink. The WFD sink that has received the RTSP M1 request message may transmit a RTSP M1 response message including a list of RTSP methods, which are supported by the WFD sink (step S602).

Subsequently, the WFD sink may transmit a RTSP M2 request message for determining a RTSP method set, which is supported by the WFD source (step S603).

When the RTSP M2 request message is received, the WFD source may respond to the request message by transmitting a RTSP M2 response message including a list of RTSP methods, which are supported by the WFD source (step S604).

The WFD source may transmit a RTSP M3 request message (RTSP GET_PARAMETER request message) specifying a list of WFD capabilities that the WFD source wishes to know (step S605).

When the RTSP M3 request message is received, the WFD sink may respond to the request message by transmitting a RTSP M3 response message (RTSP GET_PARAMETER response message) (step S606).

Based on the RTSP M3 response message, the WFD source may determine an optimal parameter set that is to be used during a WFD session, and, then, the WFD source may transmit a RTSP M4 request message (RTSP SET_PARAMETER request message), which includes the determined parameter set, to the WFD sink.

The WFD sink that has received the RTSP M4 request message may transmit a RTSP M4 response message (RTSP SET_PARAMETER response message) (step S607).

Figure 7:
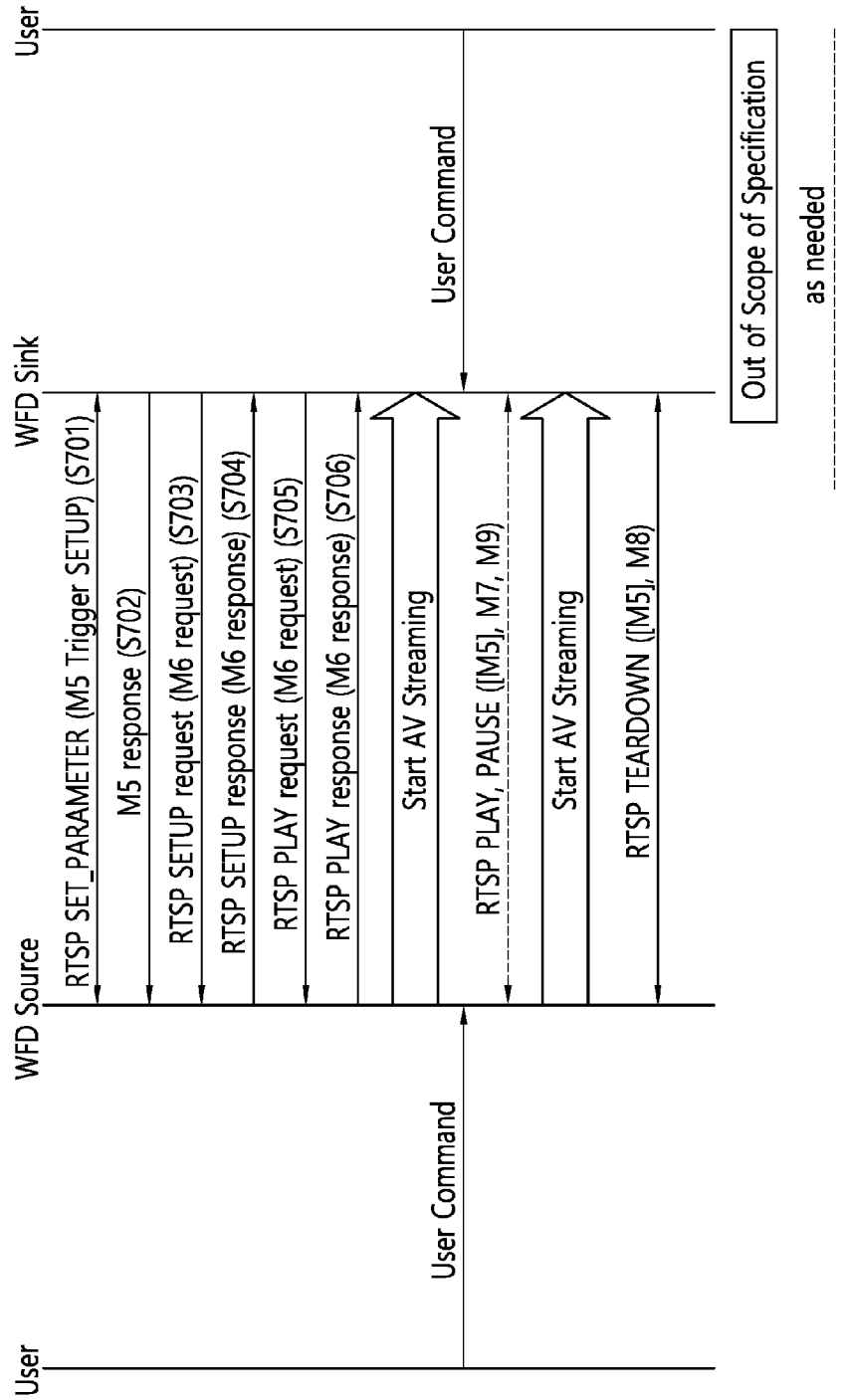
FIG. 7 is a conceptual view illustrating a WFD session establishment procedure.

FIG. 7 is a conceptual view illustrating a WFD session establishment procedure.

In FIG. 7, the WFD sources/WFD sinks that have performed WFD capability exchange and negotiation may establish a WFD session. More specifically, the WFD source may transmit a RTSP SET parameter request message (RTSP M5 Trigger SETUP request) to the WFD sink S701.

The WFD sink may transmit a RTSP M5 response message as a response to the RTSP SET parameter request message (step S702).

If the RTSP M5 message including the trigger parameter SETUP is successfully exchanged, the WFD sink may transmit a RTSP SETUP request message (RTSP M6 request) to the WFD source (step S703).

If the RTSP M6 request message is received, the WFD source may respond to the request message by transmitting a RTSP SETUP response message (RTSP M6 response) (step S704).

A successful establishment of a RTSP session may be indicated by setting up a status code of the RTSP M6 response message.

After a successful exchange of the RTSP M6 message, the WFD sink may transmit a RTSP M7 request message to the source device in order to notify that the WFD sink is ready to receive RTP streams (step S705), and the WFD source may respond to the request message by transmitting a RTSP PLAY response message (RTSP M7 response message) (step S706). A successful establishment of a WFD session may be indicated based on the status code of a RTSP PLAY response message.

After a WFD session is established, the WFD source may transmit a RTSP M3 request message (RTSP GET_PARAMETER request message) for acquiring capability corresponding to at least one RTSP parameter that is supported by the WFD sink, a RTSP M4 request message for setting up at least one RTSP parameter value in order to perform capability re-negotiation between the WFD source and WFD sink for updating an Audio/Video (AV) format, a RTSP M5 request message triggering the WFD sink to transmit a RTSP PAUSE request message (RTSP M9 request message), a RTSP M12 request message indicating that the WFD sink has entered a WFD standby mode, a RTSP M14 request message for selecting input type, input device, and other parameters that are to be used in a user input back channel (UIBC), or a RTSP M15 request message for enabling or disabling a user input back channel (UIBC), and so on, to the WFD sink. The WFD sink that has received the above-described RTSP request messages from the WFD source may respond to the received request messages by transmitting RTSP response messages.

Subsequently, the WFD sink may transmit a RTSP M7 request message (RTSP PLAY request message for initiating (or resuming) audio/video streaming, a RTSP M9 request message (RTSP PAUSE request message) for temporarily interrupting audio/video streaming that is being transmitted from the WFD source to the WFD sink, a RTSP M10 request message for requesting the WFD source to change the audio rending device, a RTSP M11 request message indicating a change in an active connector type, a RTSP M12 request message indicating that the WFD sink has entered the WFD standby mode, a M13 request message requesting the WFD source to refresh an instantaneous decoding refresh (IDR), a RTSP M14 request message for selecting input type, input device, and other parameters that are to be used in a UIBC, or a RTSP M15 request message for enabling or disabling a UIBC, and so on, to the WFD source. The WFD source that has received the RTSP request messages, which are listed above, may respond to the received request messages by transmitting RTSP response messages.

Once the WFD session is established and audio/video streaming is initiated, the WFD source and the WFD sink may carry out audio/video streaming by using a codec that is commonly supported by both the WFD source and the WFD sink. By using the codec that is commonly supported by both the WFD source and the WFD sink, interoperability between the WFD source and the WFD sink may be ensured.

WFD communication is based on a WFD IE, and a format of the WFD IE may be defined as shown below in Table 1.

TABLE 1

| Field | Size (octets) | Value (Hexadecimal) | Description |
| --- | --- | --- | --- |
| Element ID | 1 | DD | IEEE 802.11 vendor specific usage |
| Length | 1 | Variable | Length of the following fields in the IE in octets. The length field is variable and set to 4 plus the total length of WFD subelements. |
| OUI | 3 | 50-6F-9A | WFA Specific OUI |
| OUI Type | 1 | 0A | Identifying the type or version of the WFD IE. Setting to 0x0A indicates WFA WFD v1.0 |
| WFD subelements | Variable | | One or more WFD subelements appear in the WFD IE |

The format is configured of an element ID field, a Length field, a WFD-specific OUI field, a OUI type field indicating a type/version of the WFD IE, and a WFD subelement field. The WFD subelement field is configured to have a format that is shown below in Table 2.

TABLE 2

| Field | Size (octets) | Value (Hexadecimal) | Description |
| --- | --- | --- | --- |
| Subelement ID | 1 | | Identifying the type of WFD subelement. The specific value is defined in Table 5-3. |
| Length | 2 | Variable | Length of the following fields in the subelement |
| Subelements body field | Variable | | Subelement specific information fields |

The subelement ID field may be defined as shown below in Table 3.

TABLE 3

| Subelement ID (Decimal) | Notes |
| --- | --- |
| 0 | WFD Device Information |
| 1 | Associated BSSID |
| 2 | WFD Audio Formats |
| 3 | WFD Video Formats |
| 4 | WFD 3D Video Formats |
| 5 | WFD Content Protection |
| 6 | Coupled Sink Information |
| 7 | WFD Extended Capability |
| 8 | Local IP Address |
| 9 | WFD Session Information |
| 10 | Alternative MAC Address |
| 11-255 | Reserved |

Referring to Table 3, the 1-octet subelement ID field may indicate which type of information is included in the WFD subelement. More specifically, the values 0, 1, . . . , 10 of the subelement ID field may respectively indicate that each of the subelements corresponds to a WFD Device Information subelement, an Associated BSSID subelement, a WFD Audio Formats subelement, a WFD Video Formats subelement, a WFD 3D Video Formats subelement, a WFD Content Protection subelement, a Coupled Sink Information subelement, a WFD Extended Capability subelement, a Local IP Address subelement, a WFD Session Information subelement, and an Alternative MAC Address subelement. Herein, the WFD Device Information subelement may include information that is required for determining whether or not to attempt pairing with a WFD device and session generation. The Associated BSSID subelement may be used for indicating the address of the currently associated AP. Each of the WFD Audio Formats subelement, the WFD Video Formats subelement, and the WFD 3D Video Formats subelement may be used to respectively indicate capabilities of the WFD device related to audio, video, and 3D video. The WFD Content Protection subelement transports information related to a content protection method, and the Coupled Sink Information subelement may deliver information related to the status of the coupled sink, the MAC address, and so on. The WFD Extended Capability subelement may be used for transporting diverse capability information of other WFD devices, and the Local IP Address subelement may be used for transporting an IP address to a WFD peer during a TDLS setup procedure. The WFD Session Information subelement may include information corresponding to a list information technicians of WFD device information within a WFD group. In case the WFD connection method requires an interface (e.g., MAC address) that is different from the interface used in the device discovery procedure, the Alternative MAC Address subelement may transport the related information.

Hereinafter, the exemplary embodiment of the present invention will disclose a method for transmitting information corresponding to user input (UI) and subtitles via WFD (or miracast).

Most particularly, each of a UI image/subtitle may be packetized, so as to be generated as a separate Packetized Elementary Stream (PES). Thereafter, the generated PES may be overlaid and multiplexed (MUXed) to a video stream through a multiplexer of an MPEG2-transport stream (TS) and may then be transmitted. The exemplary embodiment of the present invention will disclose a method for configuring (or setting up) UI image/subtitles transmitted by the WFD source and optimized by the WFD sink.

According to the exemplary embodiment of the present invention, the WFD source may recognize a native resolution of the WFD sink and may then transmit a UI stream and a subtitle stream having a resolution that is optimized to the WFD sink. Based on this method, the WFD sink may output a UI image/subtitle image having an optimal size within the display of the WFD sink on the display of the WFD sink without any degradation in picture quality.

Additionally, in case the UI image and the subtitle image overlays within the video image, the exemplary embodiment of the present invention will hereinafter disclose a method performed by the WFD sink of including information related to overlay in the UIBC data (or UIBC body format) and transmitting the processed UIBC data. The information related to the overlay may include an overlay index, a stream index, and so on. Based on the information related to the overlay, which is included in the UIBC data being transmitted through the UIBC, the WFD source may accurately recognize the intentions of the user's motions (or operations) performed on the WFD sink.

The stream, which is transmitted from the WFD source and multiplexed to a single MPEG2-TS, may include a plurality of audio streams/video streams, UI streams, and subtitle streams, and the WFD sink may perform demultiplexing on the stream, which is multiplexed as a single MPEG2-TS, and, then, the WFD sink may overlay the plurality of different streams by using a method that is referred to as alpha-blending. Thereafter, the WFD sink may output the overlaid streams to the display of the WFD sink.

The MPEG2-TS is merely an example of a transport stream for performing overlay multiplexing on a plurality of streams, and a transport stream of another format (or structure) may be used instead of the PEG2-TS for multiplexing and transmitting audio streams/video streams, UI streams, subtitle streams, and so on.

Figure 8:
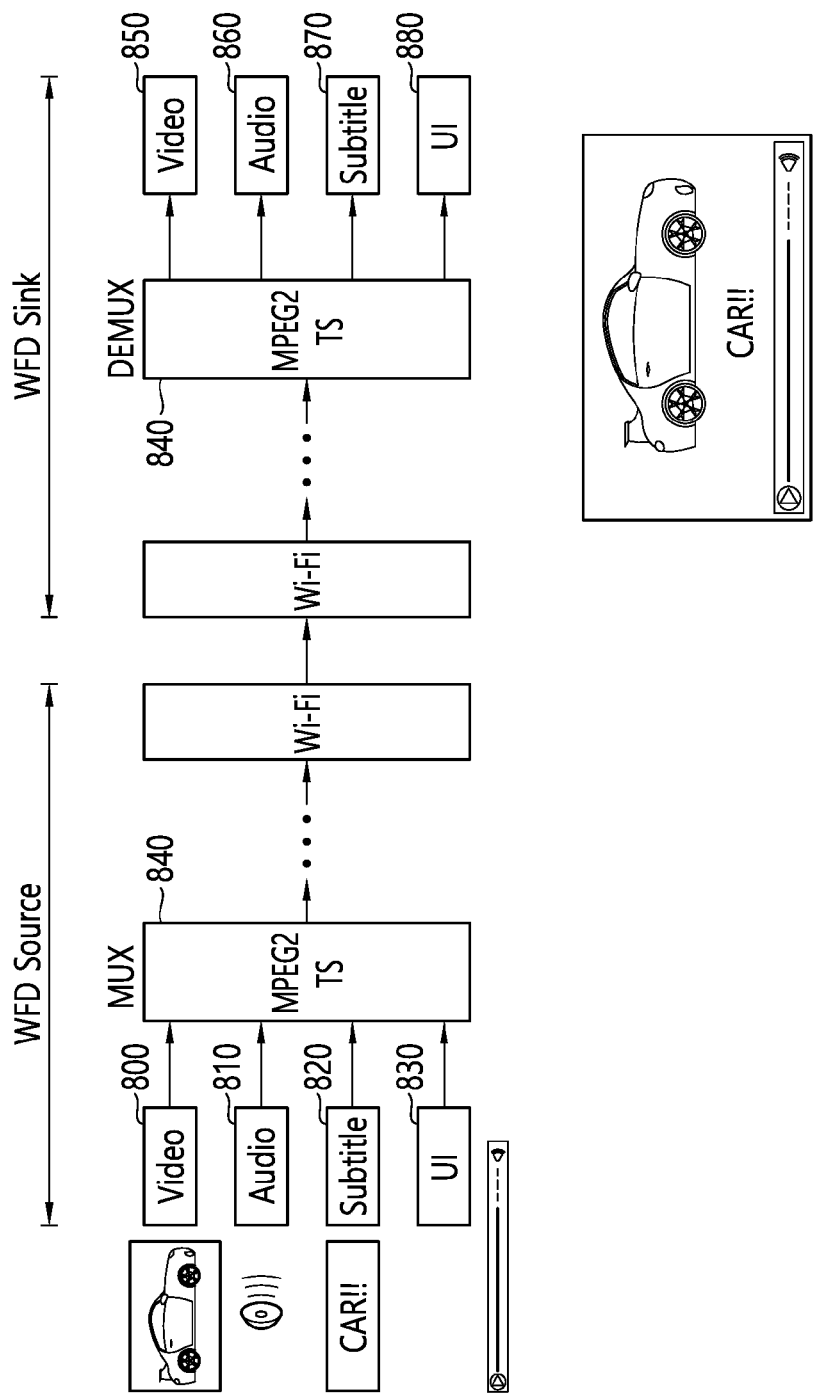
FIG. 8 is a conceptual view illustrating a method for transmitting and receiving a plurality of streams based on MPEG-TS according to an exemplary embodiment of the present invention.

FIG. 8 is a conceptual view illustrating a method for transmitting and receiving a plurality of streams based on MPEG-TS according to an exemplary embodiment of the present invention.

Referring to FIG. 8, a video stream 800, an audio stream 810, a subtitle stream 820, and a user interface stream 830 may be processed with overlay multiplexing, thereby being generated as a MPEG2-TS 840.

The video stream 800 may include video data, the audio stream 810 may include audio data, the subtitle stream 820 may include subtitle data, and the user interface stream 830 may include data corresponding to the user interface.

The video stream 800, the audio stream 810, the subtitle stream 820, and the user interface stream 830 may correspond to individual elementary streams (ESs), and each of the ESs may have a different format, a different resolution, and a different bit rate. Each of the ESs may be packetized so as to be generated as a plurality of PESs, and each of the plurality of PESs may be processed with overlay multiplexing, thereby being generated as an MPEG2-TS.

The WFD source may transmit the MPEG2-TS 840 to the WFD sink based on WiFi Direct (WiFi peer to peer (P2P)).

The WFD sink may receive the MPEG2-TS 840 based on WiFi Direct. The MPEG2-TS 840 may be demultiplexed in the WFD sink and may then be split (or separated) to a video stream 850, an audio stream 860, a subtitle stream 870, and a user interface stream 880. The separated video stream 850, audio stream 860, subtitle stream 870, and user interface stream 880 play be played (or reproduced) based on alpha-blending (or overlaying).

Figure 9:
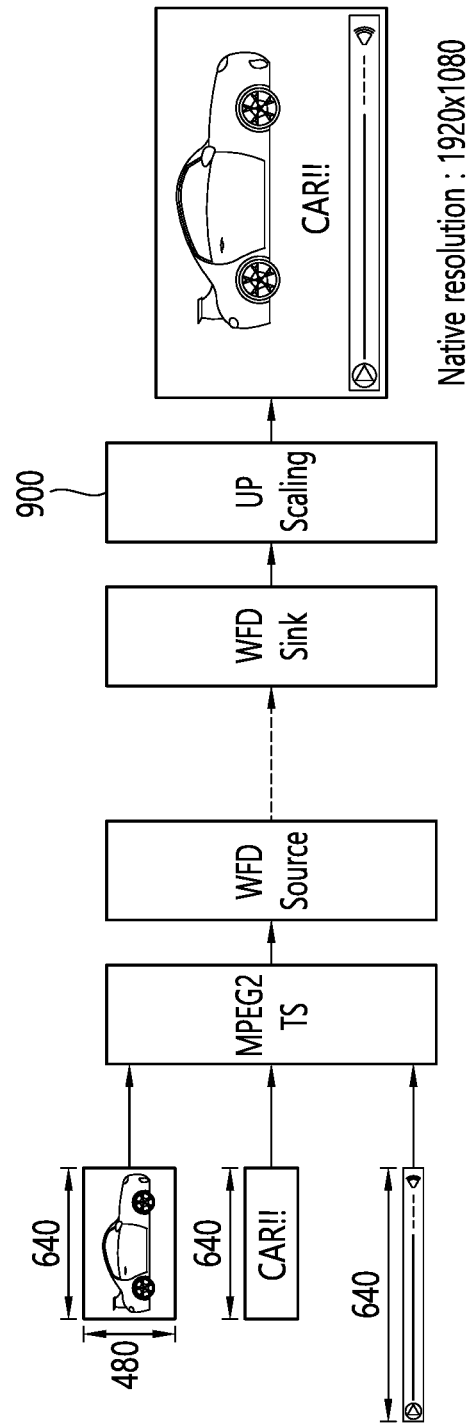
FIG. 9 is a conceptual view illustrating problems of an overlay Mux based on MPEG-TS according to tan exemplary embodiment of the present invention.

FIG. 9 is a conceptual view illustrating problems of an overlay Mux based on MPEG-TS according to tan exemplary embodiment of the present invention.

As described above, when overlaying of a plurality of ESs occurs based on MPEG2-TS, each of the plurality of ESs may have a different resolution. For most of the WFD sinks, in case the resolution of the received video stream (or video data)/subtitle stream (or subtitle data)/user interface stream (or user interface data) does not match the native resolution of the WFD sink, rescaling (upscaling or downscaling) may be performed on the resolution of the received video stream/subtitle stream/user interface stream so that the corresponding resolution can match the native resolution.

Hereinafter, although it is expressed that the resolution of the video stream/subtitle stream/user interface stream is being rescaled, this may also indicate that the resolution of the video data included in the video stream/resolution of the subtitle data included in the subtitle stream/resolution of the user interface data included in the user interface stream is being rescaled.

In case the video stream is being rescaled, this may not cause much viewing discomfort to the user. However, in case the user interface stream or the subtitle stream is rescaled, an excessively large or excessively small user interface image/subtitle image may be displayed on the WFD sink.

FIG. 9 discloses a case when upscaling 900 is performed on the resolution of the received video stream/subtitle stream/user interface stream to match the native resolution of the WFD sink.

Referring to FIG. 9, a case when the native resolution of the WFD sink is 1920×1080 and the native resolution of the WFD source is 640×480 is assumed. In this case, the resolution of the video stream, the subtitle stream, or the user interface stream that is included in the MPEG2-TS including the plurality of ESs, which are transmitted by the WFD source, may be 640×480.

The WFD sink, which has received the video stream, subtitle stream, and user interface stream having the resolution of 640×480, may perform upscaling 900 on the video stream, subtitle stream, and user interface stream having the resolution of 640×480 to 1920×1080 based on the native resolution of the WFD sink.

In this case, although the video image may be outputted to the WFD sink without much sense of awkwardness, the user interface image and the subtitle image may be unnecessarily enlarged. For example, in the WFD source, relatively large images of the subtitle and the user interface in comparison with the screen ratio may be used for visibility and simplicity in the manipulation for the user. However, in case the upscaling 900 is performed on the subtitle image and the user interface image in the WFD sink based on the native resolution of the WFD sink without considering such ratio, the subtitle image and the user interface image may be unnecessarily enlarged to an excessively large size. Moreover, in case the difference between the resolution of the subtitle image and the user interface image and the resolution of the display of the WFD sink is large, due to the upscaling 900 of the subtitle image and the user interface image, the user may sense a much larger level of awkwardness due to a degradation in text legibility.

Figure 10:
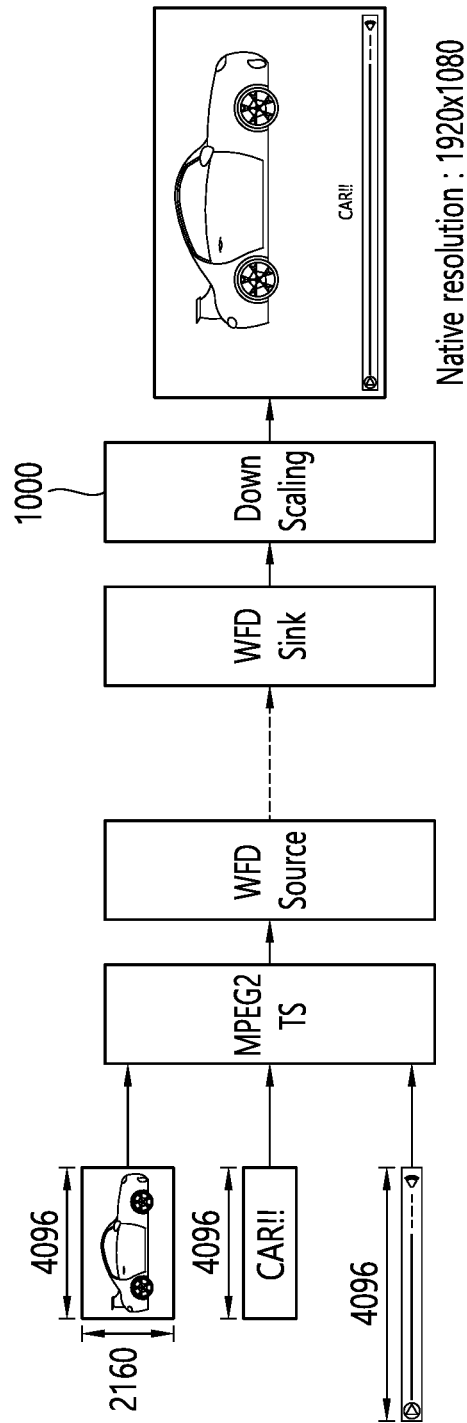
FIG. 10 is a conceptual view illustrating problems of an overlay Mux based on MPEG-TS according to tan exemplary embodiment of the present invention.

FIG. 10 is a conceptual view illustrating problems of an overlay Mux based on MPEG-TS according to tan exemplary embodiment of the present invention.

FIG. 10 discloses a case when downscaling 1000 is performed on the resolution of the received video stream/subtitle stream/user interface stream to match the native resolution of the WFD sink.

Referring to FIG. 10, a case when the native resolution of the WFD sink is 1920×1080 and the native resolution of the WFD source is 4096×2160 is assumed. In this case, the resolution of the video stream, the subtitle stream, or the user interface stream that is included in the MPEG2-TS including the plurality of ESs, which are transmitted by the WFD source, may be 4096×2160.

The WFD sink, which has received the video stream, subtitle stream, and user interface stream having the resolution of 4096×2160, may perform downscaling 1000 on the video stream, subtitle stream, and user interface stream having the resolution of 4096×2160 to 1920×1080 based on the native resolution of the WFD sink.

In this case, although the video image may be outputted to the WFD sink without causing much sense of awkwardness to the user, the user interface image and the subtitle image may be unnecessarily reduced. For example, in the WFD source, relatively small subtitles and user interface in comparison with the screen ratio may be used for visibility and simplicity in the manipulation for the user. However, in case the downscaling 1000 is performed on the subtitles and the user interface in the WFD sink based on the native resolution of the WFD sink without considering such ratio, the subtitles and the user interface may be unnecessarily reduced to an excessively small size.

More specifically, as shown in FIG. 9 and FIG. 10, in case the WFD source performs overlay encoding and transmits the ES/PES without considering the native resolution of the WFD sink, an unnecessarily large or small user interface image or subtitle image may be outputted to the WFD sink. The exemplary embodiment of the present invention discloses a method for adjusting the size of a subtitle image/user interface image, which is/are outputted in an overlaying format on the screen, in accordance with the WFD sink.

Figure 11:
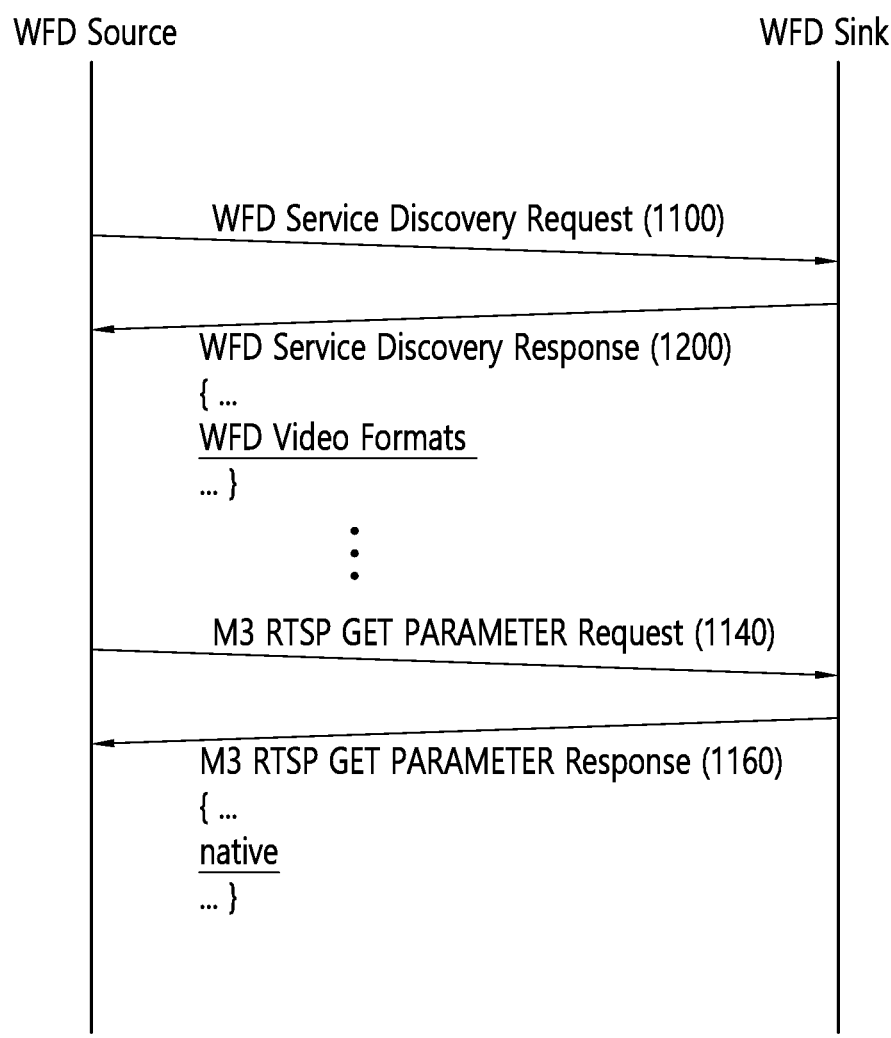
FIG. 11 is a conceptual view illustrating a method for setting a user interface and subtitles according to an exemplary embodiment of the present invention.

FIG. 11 is a conceptual view illustrating a method for setting a user interface and subtitles according to an exemplary embodiment of the present invention.

FIG. 11 discloses a method performed by the WFD source for acquiring information on the native resolution of the WFD sink. As described above, in case the user interface and the subtitles are transmitted in an overlaying format, a method for setting up (or configuring) and displaying user interface and subtitles that are optimized to the display of the WFD sink is required.

According to the exemplary embodiment of the present invention, when performing overlay encoding, the WFD source may perform overlay encoding based on a subtitle stream and a user interface stream matching the native resolution of the WFD sink.

More specifically, the WFD sink may perform rescaling (upscaling/downscaling) only on the video stream that is received from the WFD source. Since the subtitle stream and the user interface stream are transmitted by the WFD source based on the native resolution of the WFD sink, the WFD sink may not perform rescaling, which is based on the native resolution of the WFD sink, on the subtitle stream and the user interface stream.

More specifically, the WFD sink may receive a subtitle stream and a user interface stream, which match the native resolution of the WFD sink, and may directly output the received streams without performing rescaling. Accordingly, a subtitle image and a user interface adaptively matching the resolution of the WFD sink may be provided to the WFD sink without any loss in picture quality of the subtitles and the user interface.

The WFD source may acquire information corresponding to the WFD sink during the WFD service discovery procedure and the RTSP capability negotiation procedure.

Referring to FIG. 11, the WFD source may transmit a WFD service discovery request frame 1100 to the WFD sink. The WFD sink may transmit a WFD service discovery response frame 1120 as a response to the WFD service discovery request frame 1100. The WFD service discovery response frame 1120 may include information on the native resolution of the WFD sink. For example, the WFD service discovery response frame 1120 may transport information on the native resolution of the WFD sink through a native resolution/refresh rate bitmap, which is included in the WFD Video Formats subelement.

Alternatively, the WFD source may transmit a RTSP M3 request message (or M3 RTSP GET PARAMETER Request) 1140, and the WFD sink may transmit a RTSP M3 response message (or M3 RTSP GET PARAMETER Response) 1160 as a response to the RTPS M3 request message 1140. At this point, the RTSP M3 response message 1160 may include information on the native resolution of the WFD sink.

Figure 12:
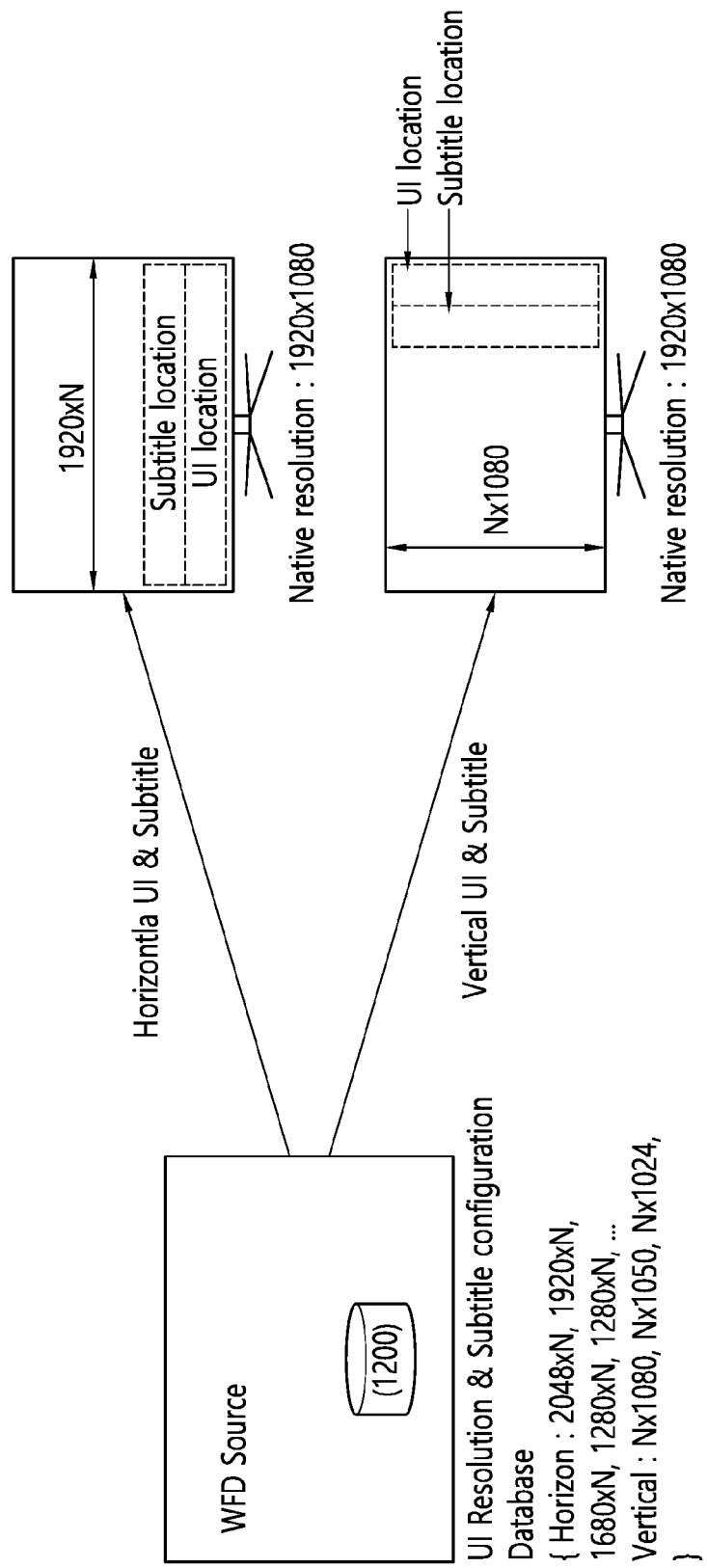
FIG. 12 is a conceptual view illustrating a method for transmitting user interface information and subtitle information of a WFD source according to an exemplary embodiment of the present invention.

FIG. 12 is a conceptual view illustrating a method for transmitting user interface information and subtitle information of a WFD source according to an exemplary embodiment of the present invention.

Referring to FIG. 12, the WFD source may recognize the native resolution of the WFD sink, and the WFD source may packetize the ES corresponding to each of the optimal user interface data and the optimal subtitle data, which match the resolution of the WFD sink, for the WDF sink and may multiplex the packetized ESs, which are then transmitted to the WFD sink.

In case the WFD source transmits a subtitle stream and a user interface stream having optimal resolution, which is determined based on the native resolution of the WFD sink, in an overlaying format with the video stream, the WFD sink may optimize and output the subtitles and user interface to the display of the WFD sink.

In case this method is used, the user may receive a subtitle stream and a user interface stream having a resolution that is independent to the resolution of the video stream (or video data) and matching the native resolution of the WFD sink. More specifically, the WFD sink may output the user interface and subtitles on the display without any degradation in the picture quality.

For this, the WFD source may include configuration sets of user interface data and subtitle data having diverse resolution/configuration in a storage 1200. The WFD source may select a user interface and subtitles that are optimal to the native resolution of the WFD source from the configuration set of user interface data and subtitle data and may then transmit the selected user interface and subtitles to the WFD sink.

For example, horizontal user interface information/horizontal subtitle information of diverse resolutions (2048xN, 1920xN, 1680xN, 1280xN, and so on) may be stored in the storage 1200 of the WFD source. Additionally, vertical user interface information/vertical subtitle information of diverse resolutions (Nx2048, Nx1920, Nx1680, Nx1280, and so on) may also be stored in the storage 1200 of the WFD source.

The WFD source may acquire not only information on the native resolution of the WFD sink during the WFD service discovery procedure and the RTSP capability negotiation procedure but also information on the resolution and direction of preferred user interface and subtitles, and the WFD source may transmit optimal subtitle stream and user interface stream to the WFD sink based on the information on the resolution and direction of the user interface and subtitles.

Figure 13:
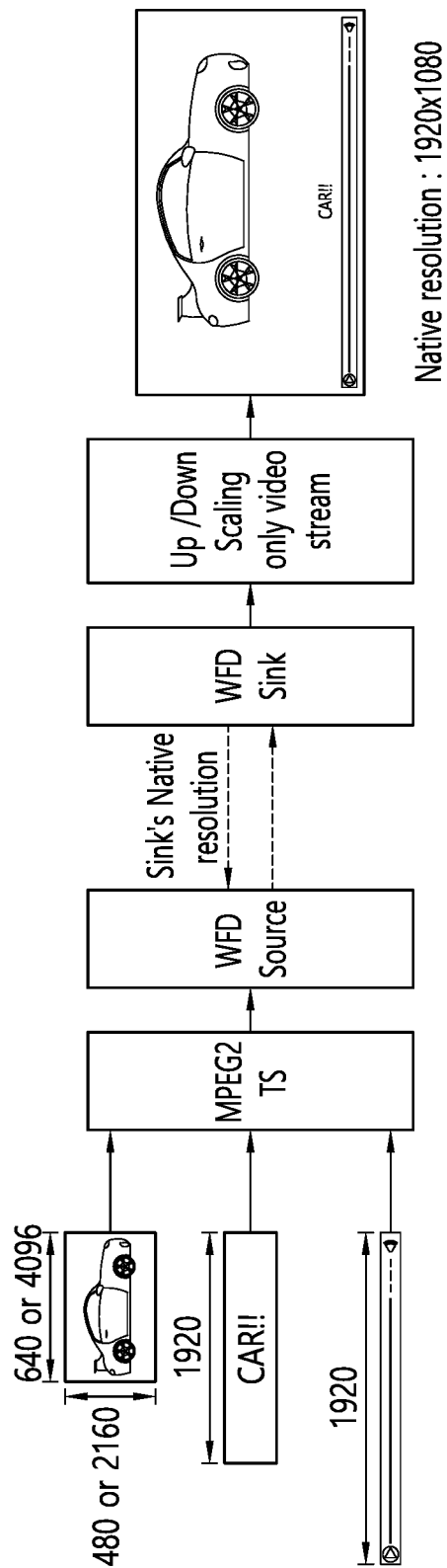
FIG. 13 is a conceptual view illustrating a method for configuring optimal user interface and subtitles according to an exemplary embodiment of the present invention.

FIG. 13 is a conceptual view illustrating a method for configuring optimal user interface and subtitles according to an exemplary embodiment of the present invention.

In FIG. 13, the WFD source may adjust the position of the user interface to fit the WFD sink based on the configuration set of the user interface data and subtitle data of the WFD source.

For example, as shown in FIG. 12, in case the configuration set of the user interface data and the subtitle data includes vertical user interface data and subtitle data and horizontal user interface data and subtitle data, horizontal or vertical user interface data and subtitle data may be transmitted from the WFD source to the WFD sink in accordance with a negotiation between the WFD source and the WFD sink.

Referring to FIG. 13, the WFD source may generate each set of vertical or horizontal subtitle data/user interface data having a resolution, which is determined independently from the resolution of the encoding/streaming video stream based on the native resolution of the WFD sink, as a stream. Thereafter, the WFD source may perform overlay multiplexing on the generated streams and the video stream, which are then transmitted via MPEG2-TS.

After performing demultiplexing on the MPEG2-TS, the WFD sink may perform rescaling (upscaling/downscaling) only on the video stream and may then output the rescaled video stream on to the display. Furthermore, the WFD sink may directly output each of the subtitle stream and the user interface stream, which are separated by performing demultiplexing on the MPEG2-TS, without performing any rescaling procedure.

Figure 14:
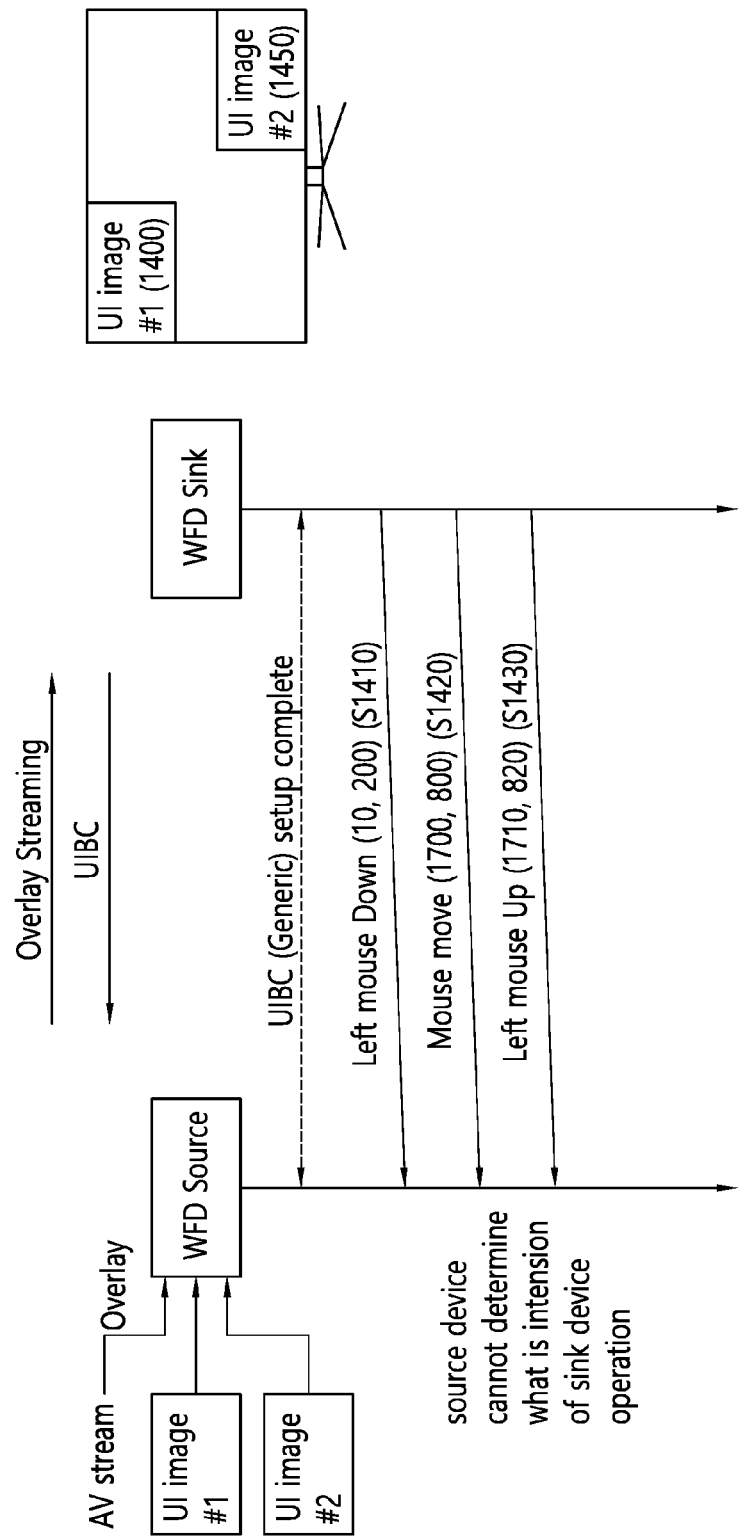
FIG. 14 is a conceptual view illustrating WFD source and WFD sink operations that are based on UIBC according to an exemplary embodiment of the present invention.

FIG. 14 is a conceptual view illustrating WFD source and WFD sink operations that are based on UIBC according to an exemplary embodiment of the present invention.

FIG. 14 discloses a method for transporting an input signal corresponding to the WFD sink of the user through a user input back channel (UIBC), in case the WFD source performs overlay encoding on the video stream, subtitle stream, and user interface stream and transmits the overlay-encoded streams. In case user input information that is inputted to the user interface, which exists in the WFD sink, based on a user operation, the UIBC corresponds to a channel for transporting the user input information to the WFD source.

Problems in interpreting the user input information when performing communication between the WFD sink and the WFD source through the conventional UIBC will hereinafter be disclosed.

Referring to FIG. 14, in case the WFD source overlays each of a plurality of user interface streams corresponding to two different user interfaces UI1 and UI2 with an MPEG2-TS, the WFD sink may output a UI1 image 1400 and a UI2 image 1450 on any position within the display.

The WFD sink may transmit an X coordinate and a Y coordinate corresponding to the user input signal, which is based on the display of the WFD sink, through the UIBC, and the WFD source cannot accurately interpret the operations corresponding to the user input signal, which is based on the display of the WFD sink. For example, a case when the user first configures a click state by pressing a left-side mouse button on the display of the WFD sink and selects the UI1 image 1400 and relocates the UI1 image 1400 to another position by moving the mouse and, then, the user cancels the click state by releasing the left-side mouse button may be assumed herein.

In this case, the WFD sink may sequentially generate a Left mouse Down (10,200) signal indicating that a Left mouse Down signal is being generated on a (10,200) position within the display of the WFD sink (step S1410), and may generate a Mouse move (1700,800) signal indicating that the mouse is moved to a (1700,800) position within the display of the WFD sink (step S1420), and may generate a Left mouse Up (1710,820) signal indicating that a Left mouse Up signal is being generated on a (1710,820) position within the display of the WFD sink (step S1430), and, then, the WFD sink may transmit the generated signals to the WFD source.

However, since output positions to which each of the UI1 image 1400 that is based on user interface stream1 corresponding to the UI1, which is overlaid with the video stream and then transmitted, and the UI2 image 1450 that is based on user interface stream2 corresponding to the UI2, which is overlaid with the video stream and then transmitted, is to be respectively outputted within the display of the WFD sink follow the determined result (or decision) of the WFD sink, the WFD source is incapable of accurately interpreting the user's intentions corresponding to the user input signal. Furthermore, in case a UIBC packet having a generic type is generated as described in the conventional method, the WFD source in incapable of accurately recognizing the UI, between UI1 and UI2, to which the user operation corresponds.

Figure 15:
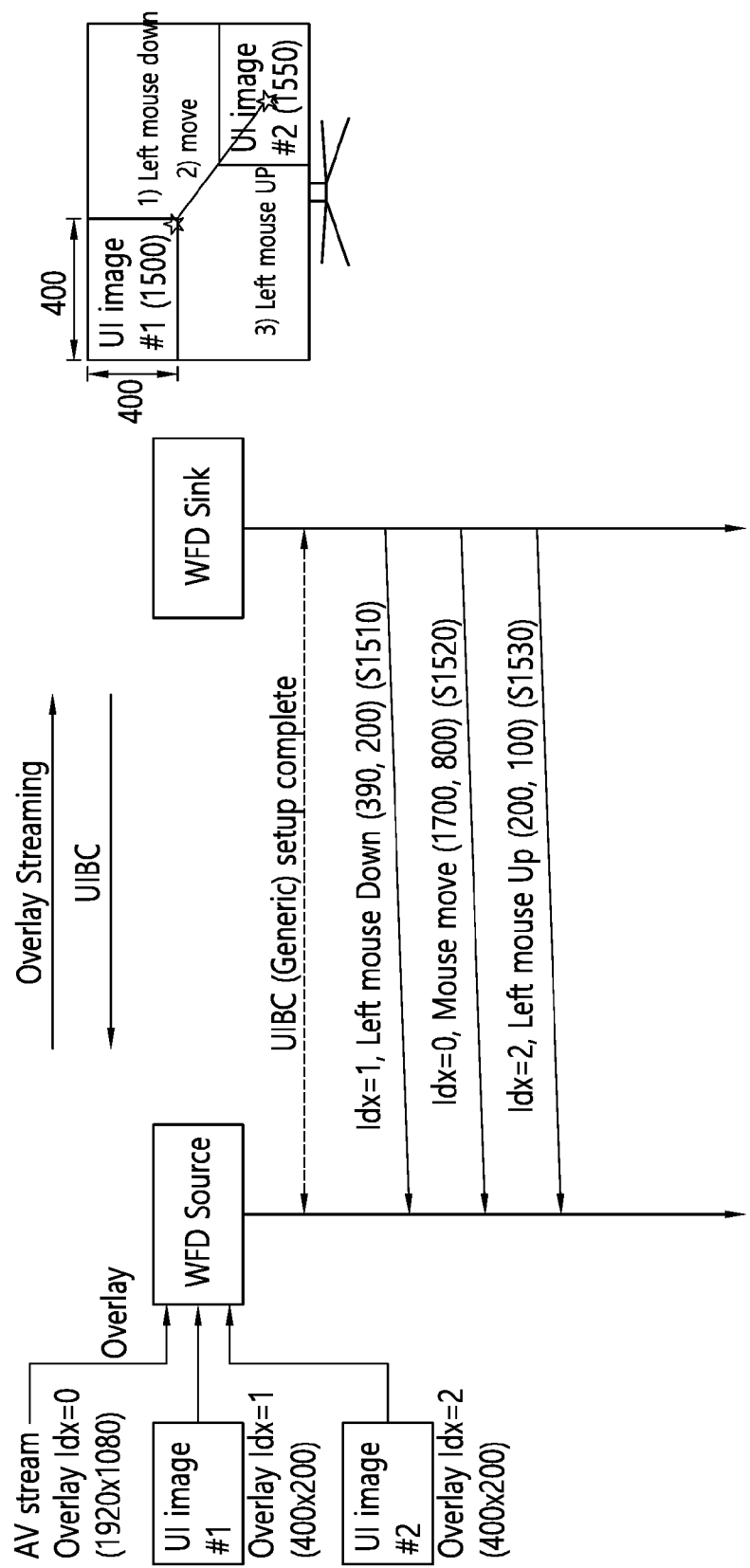
FIG. 15 is a conceptual view illustrating WFD source and WFD sink operations that are based on UIBC according to an exemplary embodiment of the present invention.

FIG. 15 is a conceptual view illustrating WFD source and WFD sink operations that are based on UIBC according to an exemplary embodiment of the present invention.

FIG. 15 discloses a method for resolving the problems in interpreting the user input information when performing communication between the WFD sink and the WFD source through the conventional UIBC, which are disclosed in FIG. 14. In order to perform the UIBC based operations, the WFD sink may transmit the existing coordinates information and additional information (overlay index or MPEG2-TS stream identifier (MPEG2TX stream id), stream type, description tag, and so on) to the WFD source through the UIBC so as to transport (or deliver) user input information.

Referring to FIG. 15, based on stream information, which is included in a UIBC generic input body of the UIBC that is transmitted by the WFD sink, the WFD source may acquire information indicating what type of operation has been performed by the user for which UI through the current WFD sink.

More specifically, the UIBC generic input body may include configurations as shown below in Table 4.

TABLE 4

| Field | Size (Octet) | Value |
|---|---|---|
| Stream information | 4 | Information of corresponding UI stream |
| Generic Input Type ID | 1 | Input type information such as Zoom In, Scroll, etc. |
| Length | 2 | Length of the following fields in octets |
| Describe | Variable | The details of the user inputs |

In Table 4, which is presented above, the stream information may include fields that are shown below in Table 5.

TABLE 5

| Field | Size (Octet) | Description |
|---|---|---|
| Overlay index | 1 | Unique index value of each overlay stream (unique index value (overlay ID)), when the WFD source performs overlay encoding (0x00-0xff) |
| Stream_id (PES header) | 1 | Stream_id information included in the PES header of the WFD source when a MPEG2-TS is generated |
| Stream_type (MPEG-TS PMT section) | 1 | Stream_type information included in the PES header of the WFD source when a MPEG2-TS is generated |
| Descriptor tag (if present) (MPEG-TS PMT section) | 1 | Descriptor_tag information included in the PES header of the WFD source when a MPEG2-TS is generated |

More specifically, the WFD source may acquire information on a UI, which is indicated by the user in the WFD sink, based on the overlay index information included in the stream information field. Additionally, the WFD source may also acquire information on the UI, which is indicated by the user, based on the stream ID information and the stream type information included in the stream information field.

The Descriptor tag may include detailed information for comprehending (or understanding) a user input signal (or user input information) generated by the user's operation corresponding to each of UI image/subtitle image/video image, which are respectively indicated by each a plurality of overlay IDs (or stream IDs). For example, the Descriptor tag may include information on an X coordinate and a Y coordinate of an image, which is outputted to the display of the WFD sink, and which corresponds to the overlay ID. For example, the values of the X coordinate and the Y coordinate included in the Descriptor tag may correspond to horizontal/vertical sizes of the UI image, which is outputted to the WFD sink. For example, in case the size of the image of UI1 (UI image1) 1500 is equal to 400×200, and in case the user has generated a user input signal from the UI image1 1500 within the display of the WFD sink, the X coordinate and Y coordinate that can be generated may be included in a range of (0,0) and up to (400,200).

As shown in FIG. 15, the WFD sink may transmit the stream information by including the stream information in the UIBC generic input body. The WFD source may determine on which UI image the WFD sink has performed the operation based on the stream information. For example, the WFD sink may perform Left Mouse Down by clicking on a specific part coordinates (390,200) within the UI image1 1500 (step S1510), and, then, the WFD sink may move the mouse to a specific part coordinates (1700,800) from the video image that is based on the video stream (step S1520), and, then, the WFD sink may perform a Mouse up operation from a specific position coordinates (200,100) within the UI image2 1550 (step S1530).

As described above, the WFD sink may deliver a set of coordinates based on the overlaying images (or overlaying streams) (e.g., UI image) instead of delivering coordinate values based on the entire screen. Therefore, in case the positions of each of the overlaying UIs is changed within the display of the WFD sink, the WFD source may accurately interpret (or determine) the user operation according to the user input signal based on the UIBC generic input body that is transmitted from the WFD sink.

Also, in the exemplary embodiment of the present invention, in case the user interface and subtitles are transmitted based on overlay multiplexing, the following method may be used for the configuration (or setup) and output of UIs and subtitles that are optimized to the display of the WFD sink. The UI and subtitles may be expressed by using the term auxiliary contents, and the streams for the UIs and subtitles may be expressed by using the term auxiliary streams. By comparing the resolution of auxiliary contents (auxiliary streams) that can be supported by the WFD source and the native resolution (or panel resolution) of the WFD sink, the lower resolution may be set up as the resolution of the auxiliary contents (auxiliary streams) being outputted from the WFD sink.

In the form of an equation, this may be expressed as Resolution for auxiliary contents in WFD sink=Minimum{Source device (WFD source)'s maximum resolution, Sink device (WFD sink)'s native resolution}.

For example, in case the maximum resolution of the WFD source is 2048×1080 (2 k), and in case the native resolution of the WFD sink is 3840×2160 (or 4096×2160) (4 k), and in case the optimal resolution of the sink device is 2 k, the resolution of the auxiliary contents being outputted from the WFD sink may be 2 k.

As another example, in case the maximum resolution of the WFD source is 4 k, and in case the native resolution of the WFD sink is 4 k, and in case the maximum resolution of the sink device is 2 k, the resolution of the auxiliary contents being outputted from the WFD sink may be 4 k.

Also, in the exemplary embodiment of the present invention, in case the user interface and subtitles are transmitted based on overlay multiplexing, the following method may be used for the configuration (or setup) and output of UIs and subtitles that are optimized to the display of the WFD sink.

By comparing the maximum resolution that can be supported for the auxiliary contents (auxiliary streams) of the WFD source and the maximum resolution that can be supported for the auxiliary contents (auxiliary streams) of the WFD sink, the lower resolution may be set up as the maximum resolution for the auxiliary contents (auxiliary streams) being outputted from the WFD sink.

In the form of an equation, this may be expressed as Resolution for auxiliary streams in WFD sink=Minimum{Source device (WFD source)'s maximum resolution of auxiliary streams and Sink device (WFD sink)'s maximum resolution of auxiliary streams}.

For example, in case the maximum resolution that can be supported for the auxiliary stream by the WFD source is 2048×1080 (2 k), and in case the maximum resolution that can be supported for the auxiliary stream by the WFD sink is 3840×2160 (4 k), the resolution of the auxiliary content being outputted from the WFD sink may be 2 k.

As another example, in case the maximum resolution that can be supported for the auxiliary stream by the WFD source is 4 k, and in case the maximum resolution that can be supported for the auxiliary stream by the WFD sink is 2 k, the resolution of the auxiliary content being outputted from the WFD sink may be 4 k.

Figure 16:
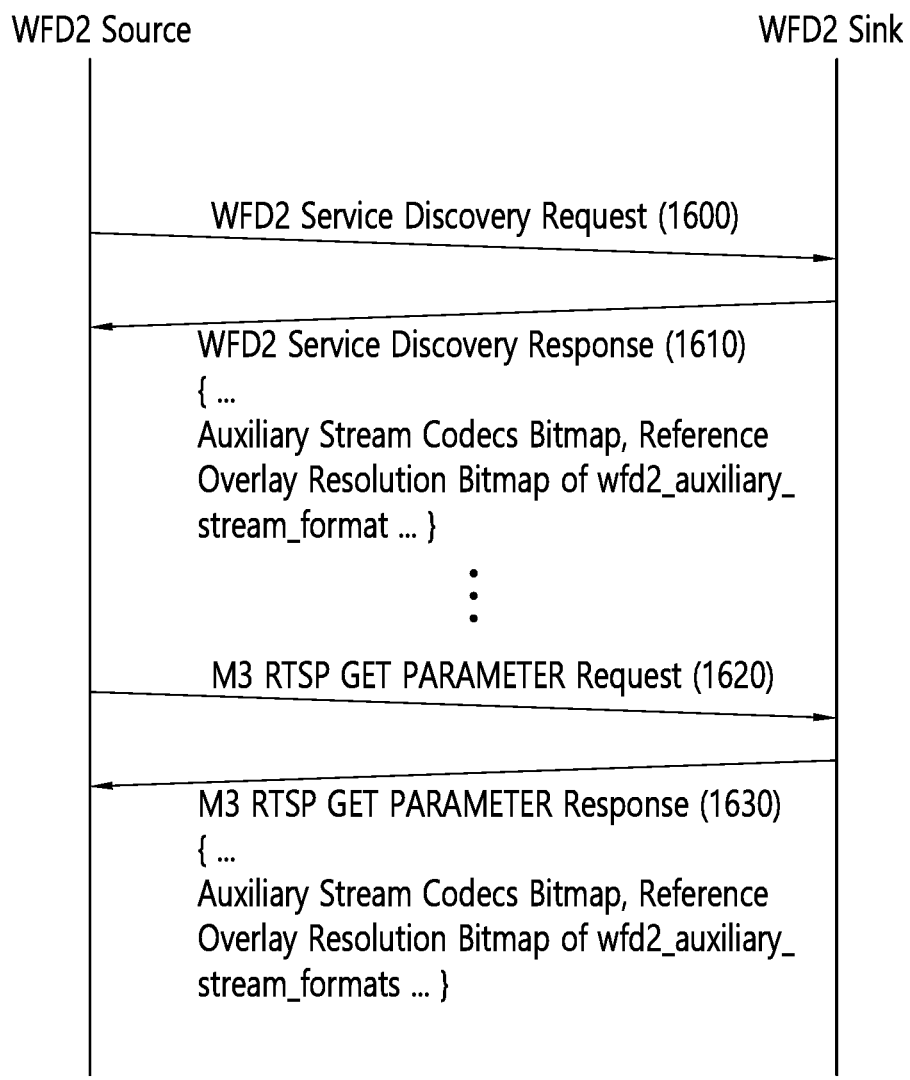
FIG. 16 is a conceptual view illustrating a method for determining resolution for auxiliary streams according to an exemplary embodiment of the present invention.

FIG. 16 is a conceptual view illustrating a method for determining resolution for auxiliary streams according to an exemplary embodiment of the present invention.

Referring to FIG. 16, the WFD source may acquire information on a format of an auxiliary stream that can be supported by the WFD sink/information on a maximum resolution of an auxiliary stream that can be supported by the WFD sink based on WFD2 service discovery and RTSP capability negotiation.

For example, the WFD source may transmit a WFD2 service discovery request frame 1600 to the WFD sink. The WFD sink may transmit a WFD2 service discovery response frame 1610 to the WFD source as a response to the WFD2 service discovery request frame 1600. The WFD2 service discovery response frame 1610 of the WFD sink may include an auxiliary stream formats subelement. The auxiliary stream formats subelement may include an auxiliary stream codec bitmap and a reference overlay resolution bitmap. The auxiliary stream codec bitmap may include information on the format of an auxiliary stream that can be supported by the WFD sink, and the reference overlay resolution bitmap may include information on a maximum resolution of an auxiliary stream that can be supported by the WFD sink.

Additionally, information on the format of an auxiliary stream that can be supported by the WFD sink/information on a maximum resolution of an auxiliary stream that can be supported by the WFD sink may be acquired based on a RTSP M3 request message (M3 RTSP GET PARAMETER Request) 1620/RTSP M3 response message (M3 RTSP GET PARAMETER Response) 1630.

The RTSP M3 response message 1630 may include an auxiliary stream format. The auxiliary stream format may include an auxiliary stream codec bitmap and a reference overlay resolution bitmap. The auxiliary stream codec bitmap may include information on the format of an auxiliary stream that can be supported by the WFD sink, and the reference overlay resolution bitmap may include information on a maximum resolution of an auxiliary stream that can be supported by the WFD sink.

The auxiliary stream codec bitmap may be defined as show below in Table 6.

TABLE 6

| Bits | Codec Name | Interpretation |
| --- | --- | --- |
| 0 | PNG | 0b0: not supported |
| | | 0b1: supported |
| 1 | JPEG | 0b0: not supported |
| | | 0b1: supported |
| 7-2 | Reserved | Set to all zeros (0's) |

Referring to Table 6, the auxiliary stream codec bitmap may include information on the codec of the supported auxiliary stream. In the auxiliary stream codec bitmap, a first bit may indicate information on whether or not auxiliary contents of a PNG format is supported, and a second bit may indicate information on whether or not auxiliary contents of a JPEG format is supported.

The reference overlay resolution bitmap may be defined as shown below in Table 7.

TABLE 7

| Bits | Codec Name | Interpretation |
| --- | --- | --- |
| 1:0 | Selection bits | 0b00: Resolution/Refresh rate table selection: Index to CEA resolution/refresh rates |
| | | 0b01: Resolution/Refresh rate table selection: Index VESA resolution/refresh rates |
| | | 0b10: Resolution/Refresh rate table selection: Index HH resolutions/refresh rates |
| | | 0b11: Reserved |
| 7:2 | Index bits | Index to resolution/refresh rate table selected by [B1:B0], values 47-63 are Reserved. |

Referring to Table 7, the reference overlay resolution bitmap may include bits for indicating a resolution that is supported in order to generate auxiliary streams.

The resolution/refresh rate being supported for auxiliary streams may refer to resolution/refresh rates of Consumer Electronics Association (CEA), Video Electronics Standards Association (VESA), and handheld (HH) formats.

Herein, 1:0 bit information of the reference overlay resolution bitmap may include information on a graphic format that is to be referred to, and information on all resolutions that are supported in the graphic format, which is selected through the 1:0 bit information based on 7:2 information, may be indicated.

Table 8 indicates exemplary indexes for the CEA resolution/refresh rate.

TABLE 8

| Index | Interpretation |
| --- | --- |
| 0 | 640 × 480 p60 |
| 1 | 720 × 480 p60 |
| 2 | 720 × 480 i60 |
| 3 | 720 × 576 p50 |
| 4 | 720 × 576 i50 |
| 5 | 1280 × 720 p30 |
| 6 | 1280 × 720 p60 |
| 7 | 1920 × 1080 p30 |
| 8 | 1920 × 1080 p60 |
| 9 | 1920 × 1080 i60 |
| 10 | 1280 × 720 p25 |
| 11 | 1280 × 720 p50 |
| 12 | 1920 × 1080 p25 |
| 13 | 1920 × 1080 p50 |
| 14 | 1920 × 1080 i50 |
| 15 | 1280 × 720 p24 |
| 16 | 1920 × 1080 p24 |
| — | Reserved |

Alternatively, in the exemplary embodiment of the present invention, in case the user interface and subtitles are transmitted based on overlay multiplexing, the following method may be used for the configuration (or setup) and output of UIs and subtitles that are optimized to the display of the WFD sink.

Between 1) a maximum resolution for the auxiliary stream of the WFD source and 2) a minimum value between a native resolution of the WFD sink and a maximum resolution for the auxiliary stream of the WFD sink, the resolution of auxiliary contents (or auxiliary streams) being outputted from the WFD sink may correspond to the minimum value of 1) and 2).

In the form on an equation, this may be expressed as Resolution for auxiliary streams=Minimum{Source device (WFD source)'s maximum resolution of auxiliary streams, Minimum[Sink device (WFD sink)'s native resolution), Sink device (WFD sink)'s maximum resolution of auxiliary streams)]}.

For example, in case the maximum resolution that can be supported for the auxiliary stream by the WFD source is 2 k, and in case the maximum resolution that can be supported for the auxiliary stream by the WFD sink is 2 k, and in case the native resolution of the WFD sink is 4 k, the resolution of the auxiliary content being outputted from the WFD sink may be 2 k.

Figure 17:
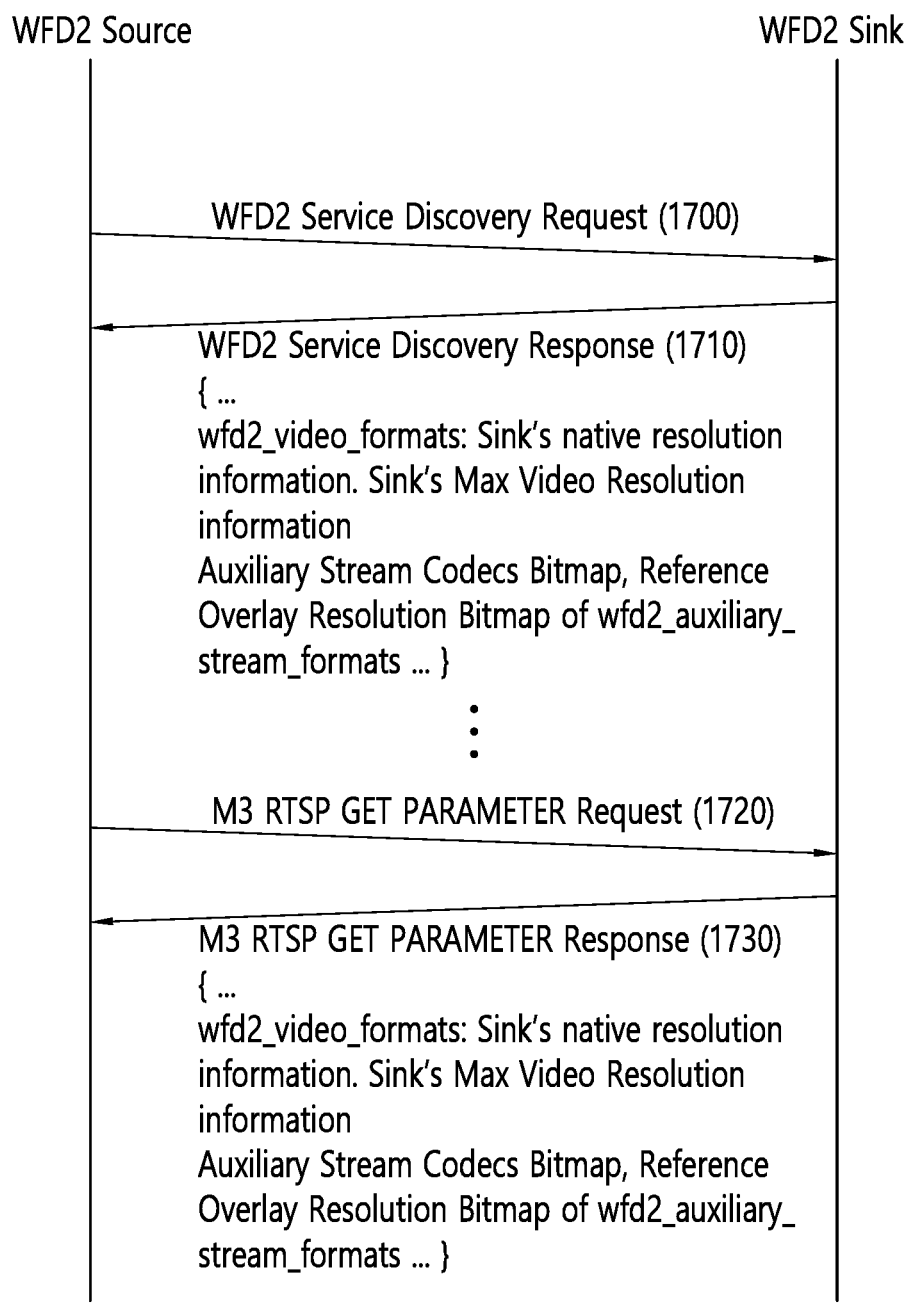
FIG. 17 is a conceptual view illustrating a method for determining resolution for auxiliary streams according to an exemplary embodiment of the present invention.

FIG. 17 is a conceptual view illustrating a method for determining resolution for auxiliary streams according to an exemplary embodiment of the present invention.

Referring to FIG. 17, the WFD source may acquire information on a native resolution of the WFD sink, information on a maximum video resolution (max video resolution) of the WFD sink, information on a format of an auxiliary stream that can be supported by the WFD sink, and information on a maximum resolution of an auxiliary stream that can be supported by the WFD sink based on WFD service discovery and RTSP capability negotiation.

For example, the WFD source may transmit a WFD2 service discovery request frame 1700 to the WFD sink. The WFD sink may transmit a WFD2 service discovery response frame 1710 to the WFD source as a response to the WFD2 service discovery request frame 1700. The WFD2 service discovery response frame 1710 of the WFD sink may include a video format subelement and an auxiliary stream formats subelement.

The video format subelement may include information on a native resolution of the WFD sink and information a maximum video resolution of the WFD sink.

The auxiliary stream formats subelement may include an auxiliary stream codec bitmap and a reference overlay resolution bitmap. The auxiliary stream codec bitmap may include information on the format of an auxiliary stream that can be supported by the WFD sink, and the reference overlay resolution bitmap may include information on a maximum resolution of an auxiliary stream that can be supported by the WFD sink.

Additionally, information on a native resolution of the WFD sink, information on a maximum video resolution of the WFD sink, information on the format of an auxiliary stream that can be supported by the WFD sink, and information on a maximum resolution of an auxiliary stream that can be supported by the WFD sink may be acquired based on a RTSP M3 request message (M3 RTSP GET PARAMETER Request) 1720/RTSP M3 response message (M3 RTSP GET PARAMETER Response) 1730.

The RTSP M3 response message 1730 may include a video format and an auxiliary stream format.

The video format may include information on a native resolution of the WFD sink and information on a maximum video resolution of the WFD sink.

The auxiliary stream format may include an auxiliary stream codec bitmap and a reference overlay resolution bitmap. The auxiliary stream codec bitmap may include information on the format of an auxiliary stream that can be supported by the WFD sink, and the reference overlay resolution bitmap may include information on a maximum resolution of an auxiliary stream that can be supported by the WFD sink.

The WFD source may determine the resolution of the auxiliary content that is to be transmitted to the WFD sink based on information included in the WFD2 service search response frame 1710/RTSP M3 response message 1730.

Table 9 shown below describes a bitmap indicating information on a native resolution of the WFD sink being included in the video format subelement.

TABLE 9

| Bits | Codec Name | Interpretation |
|---|---|---|
| 2:0 | Selection bits | 0b000: Resolution/Refresh rate table selection: Index to CEA resolution/refresh rates<br>0b001: Resolution/Refresh rate table selection: Index VESA resolution/refresh rates<br>0b010: Resolution/Refresh rate table selection: Index HH resolutions/refresh rates<br>0b011~0b111: Reserved |
| 7:3 | Index bits | 0b0: not supported<br>0b1: supported |

Information on the native resolution of the WFD sink may be indicated based on an index for the resolution supported in the selected graphic format. More specifically, in the video format subelement, information on the native resolution of the WFD sink may be indicated through the index for the resolution/refresh rate of one of CEA, VESA, and HH.

The information on a format of an auxiliary stream that can be supported by the WFD sink, and information on a maximum resolution of an auxiliary stream that can be supported by the WFD sink may be transmitted based on the bitmap that is shown in the above-described Table 6 and Table 7.

Alternatively, in the exemplary embodiment of the present invention, in case the user interface and subtitles are transmitted based on overlay multiplexing, the following method may be used for the configuration (or setup) and output of UIs and subtitles that are optimized to the display of the WFD sink.

Between 1) a maximum resolution of the WFD source and 2) a minimum value between a native resolution of the WFD sink and a maximum resolution of the WFD sink, the resolution of auxiliary contents (or auxiliary streams) being outputted from the WFD sink may correspond to the minimum value of 1) and 2).

In the form of an equation, this may be expressed as Resolution for auxiliary streams in WFD sink=Minimum{Source device (WFD source)'s maximum resolution), Minimum[Sink device (WFD sink)'s native resolution, Sink device (WFD sink)'s maximum resolution]}.

The maximum resolution of the WFD source may correspond to a maximum resolution for an auxiliary stream that is supported by a specific auxiliary (AUX), which is to be selected by the source.

The maximum resolution of the WFD sink may be indicated based on the maximum resolution information, which is included in the RTSP M3 response message. The information on the maximum resolution of the WFD sink may be included in parameters of the RTSP M3 response message, such as wfd-video-codecs, wfd-3d-video-formats, and wfd-preferred-display-mode.

The native resolution of the WFD sink may be indicated based on native resolution information being included in the RTSP M3 response message. The native resolution information may be included in parameters of the RTSP M3 response message, such as wfd-video-codecs, wfd-3d-video-formats, and wfd-preferred-display-mode.

For example, in case the maximum resolution of the WFD source is 2 k, and in case the maximum source of the WFD sink is 2 k, and in case the native resolution of the WFD sink is 4 k, the resolution of the auxiliary contents being outputted from the WFD sink may be 2 k.

Figure 18:
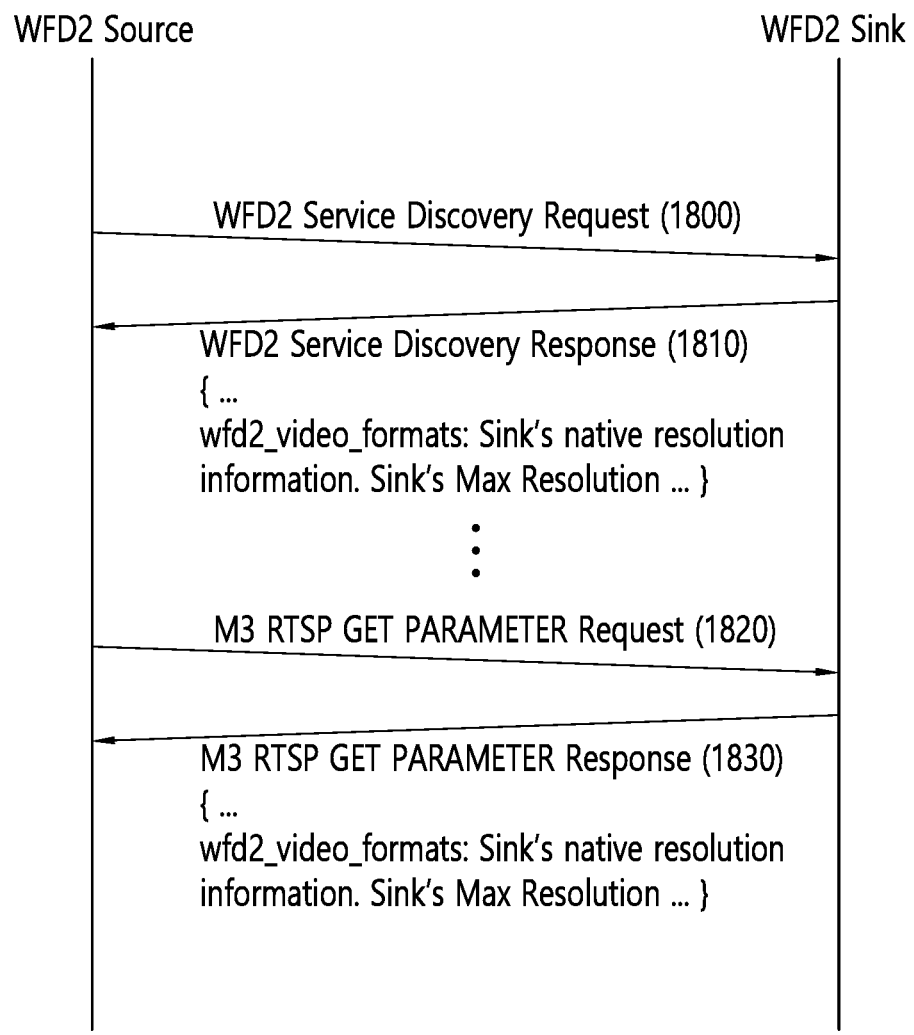
FIG. 18 is a conceptual view illustrating a method for determining resolution for auxiliary streams according to an exemplary embodiment of the present invention.

FIG. 18 is a conceptual view illustrating a method for determining resolution for auxiliary streams according to an exemplary embodiment of the present invention.

Referring to FIG. 18, the WFD source may acquire information on a native resolution of the WFD sink and information on a maximum resolution of the WFD sink based on WFD service discovery and RTSP capability negotiation.

For example, the WFD source may transmit a WFD2 service discovery request frame 1800 to the WFD sink. The WFD sink may transmit a WFD2 service discovery response frame 1810 to the WFD source as a response to the WFD2 service discovery request frame 1800. The WFD2 service discovery response frame 1810 of the WFD sink may include a video format subelement.

The video format subelement may include information on a native resolution of the WFD sink and information a maximum resolution of the WFD sink.

Additionally, information on a native resolution of the WFD sink and information on a maximum resolution of the WFD sink may be acquired based on a RTSP M3 request message (M3 RTSP GET PARAMETER Request) 1820/RTSP M3 response message (M3 RTSP GET PARAMETER Response) 1830.

The RTSP M3 response message 1830 may include a video format.

The video format may include information on a native resolution of the WFD sink and information on a maximum resolution of the WFD sink.

The WFD source may determine the resolution of the auxiliary content that is to be transmitted to the WFD sink based on information included in the WFD2 service search response frame 1810/RTSP M3 response message 1830.

Figure 19:
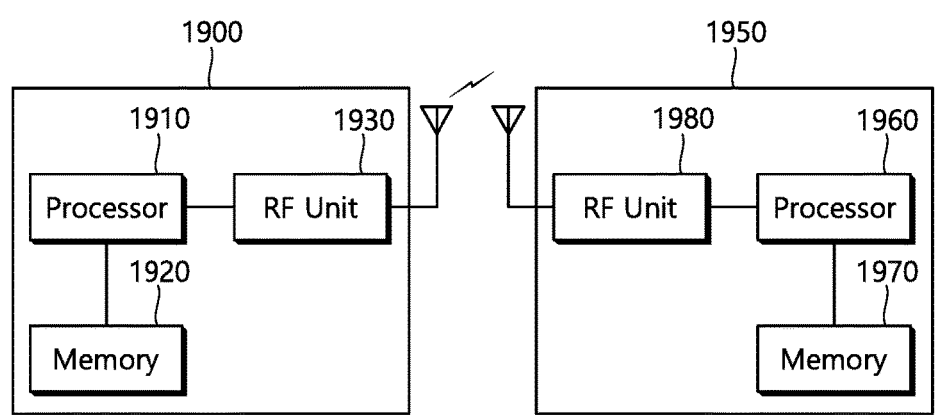
FIG. 19 is a block view illustrating a wireless device to which the exemplary embodiment of the present invention can be applied.

FIG. 19 is a block view illustrating a wireless device to which the exemplary embodiment of the present invention can be applied.

Referring to FIG. 19, the wireless device may correspond to a WFD source 1900 and a WFD sink 1950 that can embody the above-described exemplary embodiment of the present invention.

The WFD source 1900 includes a processor 1910, a memory 1920, and a radio frequency (RF) unit 1930.

The RF unit 1930 is connected to the processor 1910, thereby being capable of transmitting and/or receiving radio signals.

The processor 1910 implements the functions, processes, and/or methods proposed in the present invention. For example, the processor 1910 may be implemented to perform the operations of the WFD source 1900 according to the above-described exemplary embodiments of the present invention. The processor may perform the operations of the WFD source 1900, which are disclosed in the exemplary embodiments of FIG. 1 to FIG. 18.

For example, the processor 1910 may transmit a WFD service discovery request frame for discovering a service capability to the WFD sink, and may receive a WFD service discovery response frame from the WFD sink as a response to the WFD service discovery request frame, and may then set up a WFD connection with the WFD sink based on the WFD service discovery response frame.

Additionally, after establishing the WFD connection, the processor 1910 may be configured to transmit a RTSP parameter request message, which is based on a real time streaming protocol (RTSP), to the WFD sink for a capability negotiation procedure with the WFD sink, and, then, to transmit a RTSP parameter response message to the WFD sink as a response to the RTSP parameter request message.

Also, after performing the capability negotiation procedure, the processor 1910 may be configured to transmit a transport stream, which is configured by overlay multiplexing a video stream including video data of a first resolution and an auxiliary stream including auxiliary data of a second resolution, to the WFD sink. Herein, the WFD discovery response frame may include information related to the second resolution for determining the second resolution, and the RTSP parameter response frame may include information related to the second resolution.

The auxiliary data may include subtitle data and user interface data.

As described above, the information related to the second resolution may include information on the native resolution of the WFD sink, and the first resolution may be determined based on the native resolution of the WFD source, and the second resolution may be determined based on the native resolution of the WFD sink.

Alternatively, the information related to the second resolution may include information on a maximum resolution that is supported for the auxiliary data of the WFD sink, and the first resolution may be determined based on the native resolution of the WFD source, and the second resolution may be determined based on the information on the maximum resolution that is supported for the auxiliary data of the WFD sink.

The video data may be rescaled in the WFD sink and may then be outputted in a resolution other than the first resolution, and the auxiliary data may be outputted from the WFD sink in the second resolution without being processed with rescaling.

Additionally, the processor 1910 may be configured to receive user operation information according to the user operation in the WFD sink from the WFD sink through a user input back channel (UIBC) and to perform operations corresponding to the user operation information.

The user operation information may include stream information, and the stream information may include identification information indicating on which image among a plurality of overlaying images, which are based on each of the video data and the auxiliary data that are outputted from the WFD sink, the user operation is being performed.

The WFD sink 1950 includes a processor 1960, a memory 1970, and a radio frequency (RF) unit 1980.

The RF unit 1980 is connected to the processor 1960, thereby being capable of transmitting and/or receiving radio signals.

The processor 1960 implements the functions, processes, and/or methods proposed in the present invention. For example, the processor 1960 may be implemented to perform the operations of the WFD sink 1950 according to the above-described exemplary embodiments of the present invention. The processor may perform the operations of the WFD sink 1950, which are disclosed in the exemplary embodiments of FIG. 1 to FIG. 18.

For example, the processor 1960 may be configured to transmit information for determining a resolution of auxiliary data that are outputted from the WFD sink to the WFD source. For example, the processor 1960 may be configured to transmit information on the native resolution of the WFD sink, information on the resolution of auxiliary contents that can be outputted from the WFD sink, and so on, based on the WFD service discovery response frame/RTSP based response message.

The processor 1960 may demultiplex the transport stream (MPEG2-TS), which is received from the WFD source, and, then, the processor 1960 may rescale the video data being included in the video stream and may output the rescaled video data to the display in another resolution, and the processor 1960 may output the subtitle data and the user interface data, which are included in the auxiliary stream (subtitle stream, user interface stream), in the same resolution as the received data without performing rescaling.

The processor 1910 and 1960 may include an application-specific integrated circuit (ASIC), another chip set, a logical circuit, a data processing device, and/or a converter converting a baseband signal and a radio signal to and from one another. The memory 1920 and 1970 may include a read-only memory (ROM), a random access memory (RAM), a flash memory, a memory card, a storage medium, and/or another storage device. The RF unit 1930 and 1980 may include one or more antennas transmitting and/or receiving radio signals.

When the exemplary embodiment is implemented as software, the above-described method may be implemented as a module (process, function, and so on) performing the above-described functions. The module may be stored in the memory 1920 and 1970 and may be executed by the processor 1910 and 1960. The memory 1920 and 1970 may be located inside or outside of the processor 1910 and 1960 and may be connected to the processor 1910 and 1960 through a diversity of well-known means.

What is claimed is:

1. A method for outputting auxiliary data in a Wi-Fi Display (WFD), comprising:
   setting up, by a WFD source, a WFD connection with a WFD sink;
   after setting up the WFD connection, transmitting, by the WFD source, a RTSP parameter request message being configured based on a real time streaming protocol (RTSP) to the WFD sink;
   receiving, by the WFD source, a RTSP parameter response message from the WFD sink as a response to the RTSP parameter request message, wherein the RTSP parameter response message comprises information on a native resolution of the WFD sink, and information on a maximum video resolution of the WFD sink; and
   transmitting, by the WFD source, a transport stream to the WFD sink, wherein the transport stream is configured by overlay multiplexing a video stream including video data of a first resolution and an auxiliary stream including auxiliary data of a second resolution.

2. The method of claim 1, wherein
   wherein the second resolution is determined based on a minimum value of the native resolution of the WFD sink, the maximum video resolution of the WFD sink, and a maximum resolution of the WFD source.

3. The method of claim 1, wherein the auxiliary data include subtitle data and user interface data.

4. The method of claim 1, wherein the information on the native resolution of the WFD sink is indicated by an index of resolution/refresh rates for one of Consumer Electronics Association (CEA), Video Electronics Standards Association (VESA), and handheld (HH) formats.

5. The method of claim 1, wherein the RTSP parameter response message further comprises information on a format of the auxiliary stream that can be supported by the WFD sink,
wherein the information on the format the auxiliary stream at least indicates Portable Network Graphics (PNG) format and Joint Photographic Experts Group (JPEG) format.

6. A Wi-Fi Display (WFD) source for transmitting auxiliary data in a WFD, comprising:
a radio frequency (RF) unit transmitting or receiving radio signals; and
a processor being operatively connected to the RF unit, wherein the processor is configured:
to set up a WFD connection with a WFD sink,
after setting up the WFD connection, to transmit a RTSP parameter request message being configured based on a real time streaming protocol (RTSP) to the WFD sink,
to receive a RTSP parameter response message from the WFD sink as a response to the RTSP parameter request message, wherein the RTSP parameter response message comprises information on a native resolution of the WFD sink, and information on a maximum video resolution of the WFD sink, and
to transmit a transport stream to the WFD sink, wherein the transport stream is configured by overlay multiplexing a video stream including video data of a first resolution and an auxiliary stream including auxiliary data of a second resolution.

7. The WFD source of claim 6, wherein the second resolution is determined based on a minimum value of the native resolution of the WFD sink, the maximum video resolution of the WFD sink, and a maximum resolution of the WFD source.

8. The WFD source of claim 6, wherein the auxiliary data include subtitle data and user interface data.

9. The WFD source of claim 6, wherein the information on the native resolution of the WFD sink is indicated by an index of resolution/refresh rates for one of Consumer Electronics Association (CEA), Video Electronics Standards Association (VESA), and handheld (HH) formats.

10. The WFD source of claim 6, wherein the RTSP parameter response message further comprises information on a format of the auxiliary stream that can be supported by the WFD sink,
wherein the information on the format the auxiliary stream at least indicates Portable Network Graphics (PNG) format and Joint Photographic Experts Group (JPEG) format.

* * * * *